US012607949B2

(12) United States Patent
Suzuki et al.

(10) Patent No.: US 12,607,949 B2
(45) Date of Patent: Apr. 21, 2026

(54) IMAGE FORMING METHOD, TONER, DEVELOPER, PRINTED PRODUCT, TONER STORAGE UNIT, AND IMAGE FORMING APPARATUS

(71) Applicants: Kazumi Suzuki, Shizuoka (JP); Toyoshi Sawada, Shizuoka (JP); Katsunori Kurose, Shizuoka (JP); Akihiro Kaneko, Kanagawa (JP)

(72) Inventors: Kazumi Suzuki, Shizuoka (JP); Toyoshi Sawada, Shizuoka (JP); Katsunori Kurose, Shizuoka (JP); Akihiro Kaneko, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 471 days.

(21) Appl. No.: 18/263,360

(22) PCT Filed: Dec. 27, 2021

(86) PCT No.: PCT/JP2021/048458

§ 371 (c)(1),
(2) Date: Jul. 28, 2023

(87) PCT Pub. No.: WO2022/172630

PCT Pub. Date: Aug. 18, 2022

(65) Prior Publication Data

US 2024/0103408 A1 Mar. 28, 2024

(30) Foreign Application Priority Data

Feb. 10, 2021 (JP) ................................ 2021-019852

(51) Int. Cl.

*G03G 9/097* (2006.01)
*G03G 9/09* (2006.01)
*G03G 9/10* (2006.01)

(52) U.S. Cl.

CPC ........... *G03G 9/0902* (2013.01); *G03G 9/103* (2020.08); *G03G 2215/066* (2013.01); *G03G 2215/2074* (2013.01)

(58) Field of Classification Search

CPC ... G03G 9/0825; G03G 9/09708; G03G 13/08
See application file for complete search history.

(56) References Cited

U.S. PATENT DOCUMENTS

2008/0071004 A1 3/2008 Taniguchi et al.
2013/0071143 A1 3/2013 Blanton et al.
(Continued)

FOREIGN PATENT DOCUMENTS

JP 08-314179 1/1996
JP 09-106094 4/1997
(Continued)

OTHER PUBLICATIONS

Office Action issued in Japanese Patent Application No. 2021-019852, issued Feb. 18, 2025, 7 pages, with English translation.
(Continued)

*Primary Examiner* — Peter L Vajda
(74) *Attorney, Agent, or Firm* — Grüneberg Global IP, PLLC

(57) ABSTRACT

An image forming method includes forming an electrostatic latent image on an electrostatic latent image bearer, developing the electrostatic image with a toner to form a visible image, transferring the visible image onto a recording medium, and fixing the transferred visible image on the recording medium. The toner includes toner base particles each including a binder resin, a release agent, and particles of an inorganic antibacterial antiviral agent, and satisfies conditions (1) to (3) below. The image forming method satisfies a relationship of 2.0X (micrometers)≤Z≤2.5X (micrometers). Conditions (1) the number average particle
(Continued)

diameter X of the particles of the inorganic antibacterial antiviral agent is 1.5 (micrometers)≤X≤2.5 (micrometers), (2) 3X (micrometers)≤Y≤4X (micrometers), and (3) an amount of the inorganic antibacterial antiviral agent in the toner is 2.8% by mass or greater, but 5.0% by mass or less.

13 Claims, 6 Drawing Sheets

(56) References Cited

U.S. PATENT DOCUMENTS

| | | | | |
|---|---|---|---|---|
| 2015/0079504 | A1* | 3/2015 | Farrugia | B32B 5/16 430/108.1 |
| 2016/0327879 | A1 | 11/2016 | Farrugia et al. | |
| 2020/0333720 | A1 | 10/2020 | Sawada et al. | |
| 2021/0311416 | A1 | 10/2021 | Masuda et al. | |
| 2021/0341851 | A1 | 11/2021 | Suzuki et al. | |

FOREIGN PATENT DOCUMENTS

| | | | |
|---|---|---|---|
| JP | 2000-330326 | | 11/2000 |
| JP | 2003-241414 | | 8/2003 |
| JP | 2003-241423 | | 8/2003 |
| JP | 2004-093784 | | 3/2004 |
| JP | 2014-531621 | A | 11/2014 |
| JP | 2016-212396 | | 12/2016 |
| KR | 10-2010-0072711 | A | 7/2010 |
| WO | WO2006/046496 | A1 | 5/2006 |

OTHER PUBLICATIONS

International Search Report Issued Apr. 4, 2022 for counterpart International Patent Application No. PCT/JP2021/048458 filed Dec. 27, 2021.

* cited by examiner

[Fig. 1]
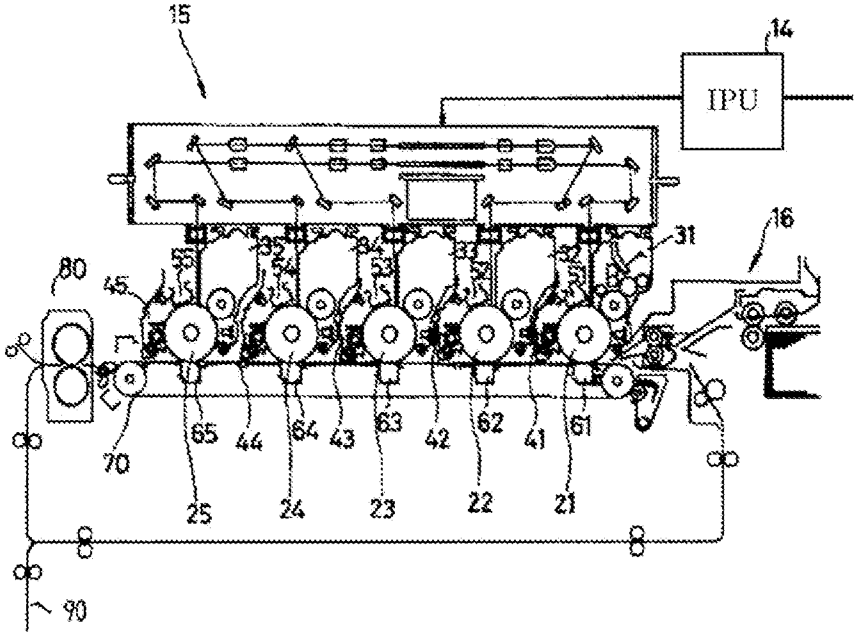
[Fig. 2]
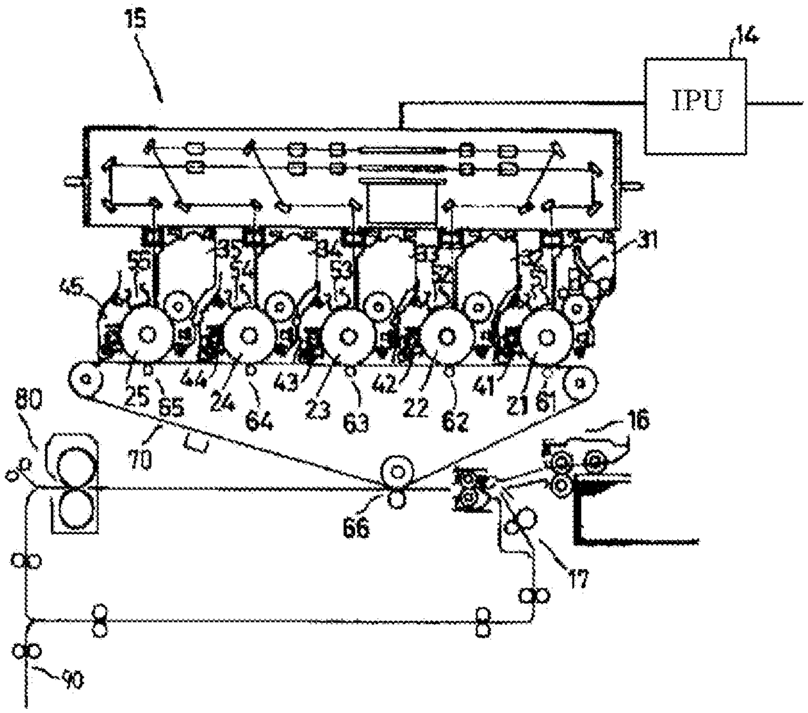

[Fig. 3]
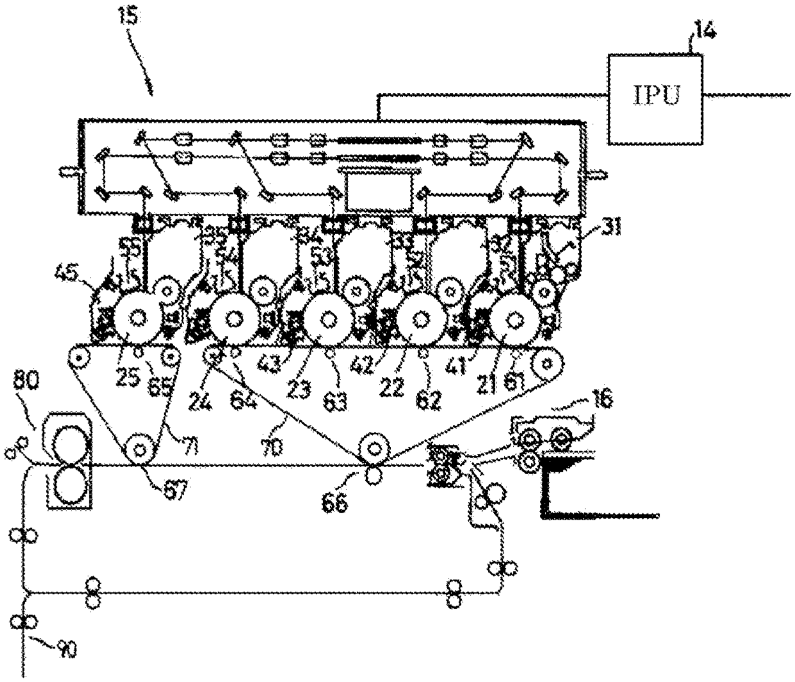
[Fig. 4]
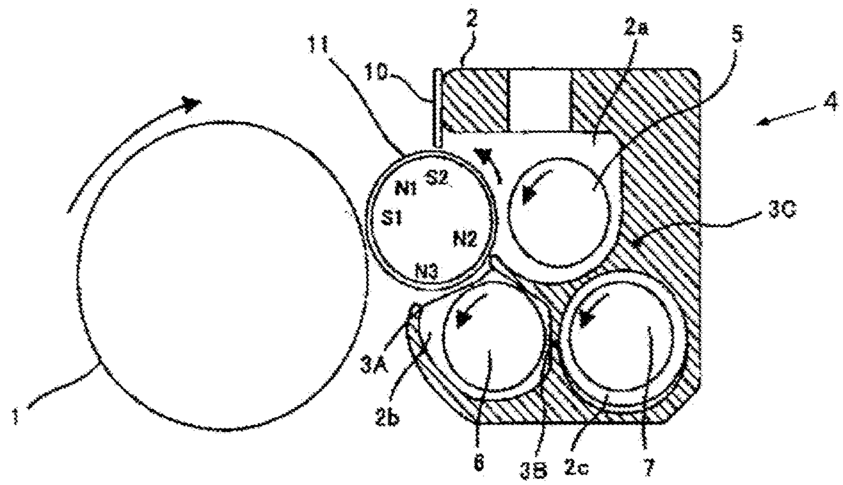
[Fig. 5]
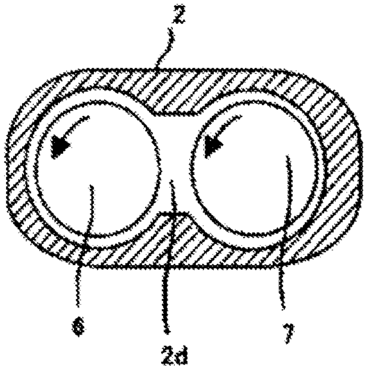

[Fig. 6]
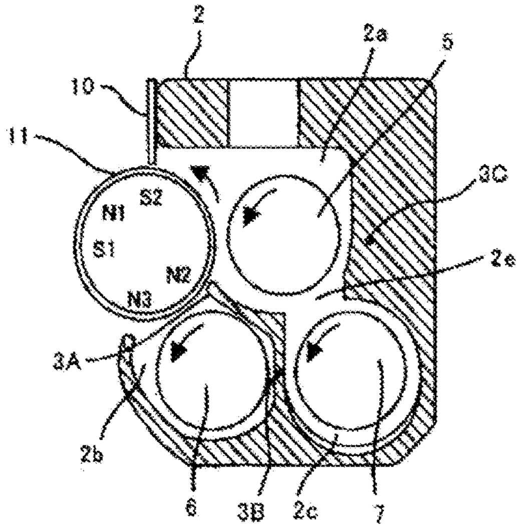
[Fig. 7]
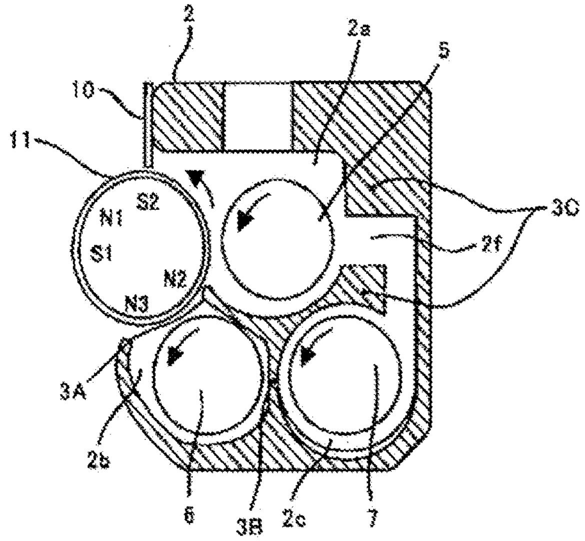
[Fig. 8]
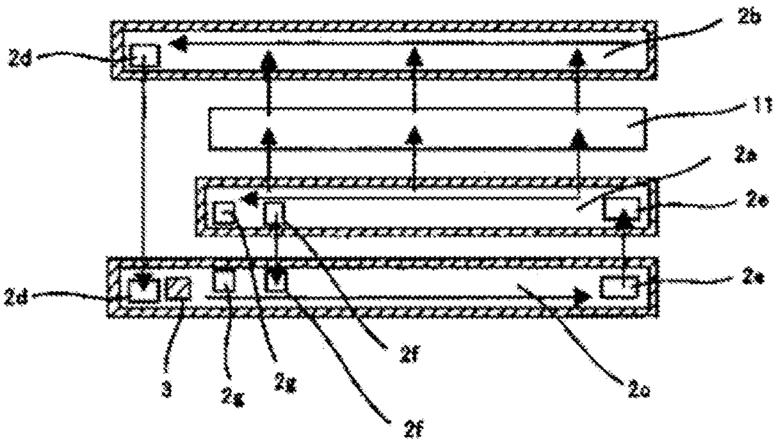

[Fig. 9]
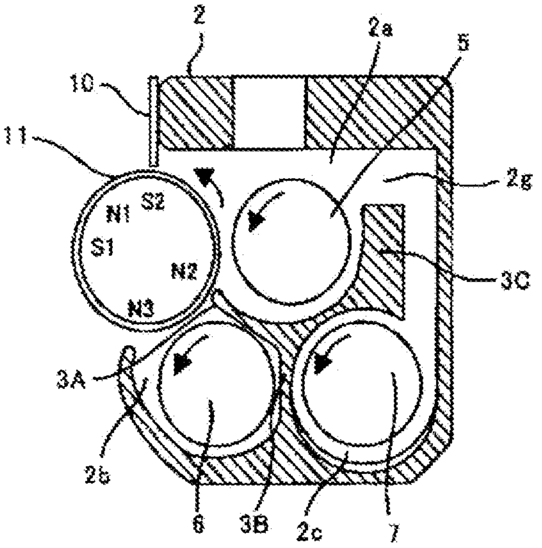
[Fig. 10]
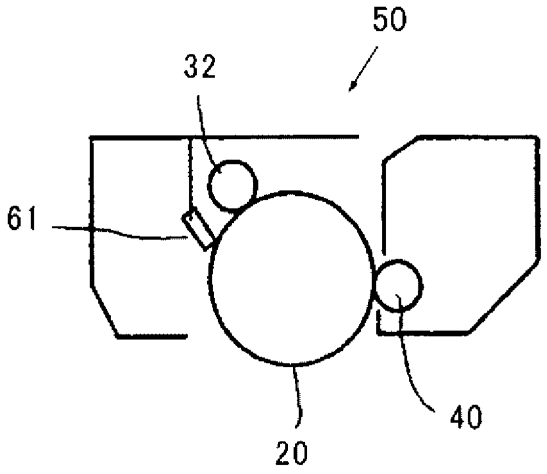
[Fig. 11A]
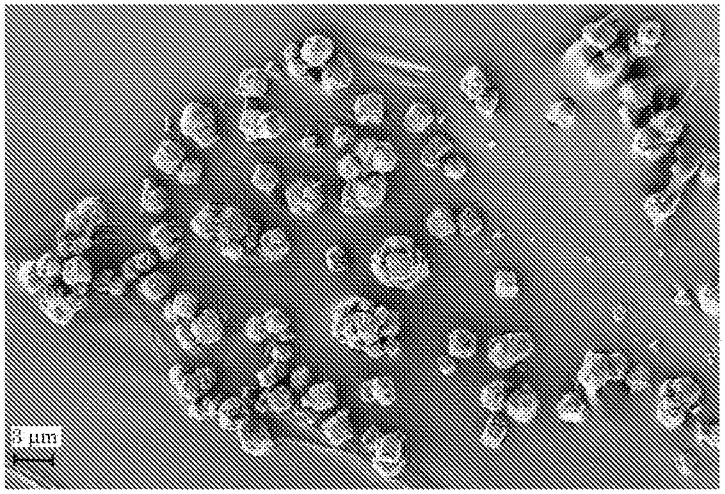

[Fig. 11B]
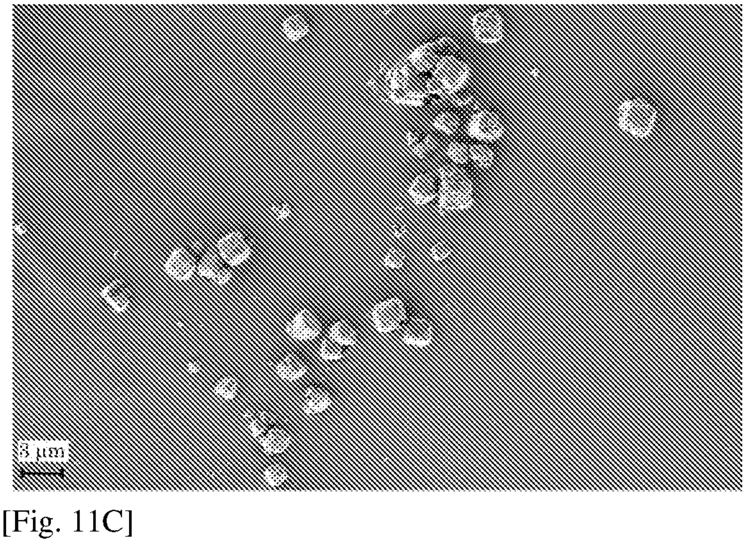
[Fig. 11C]
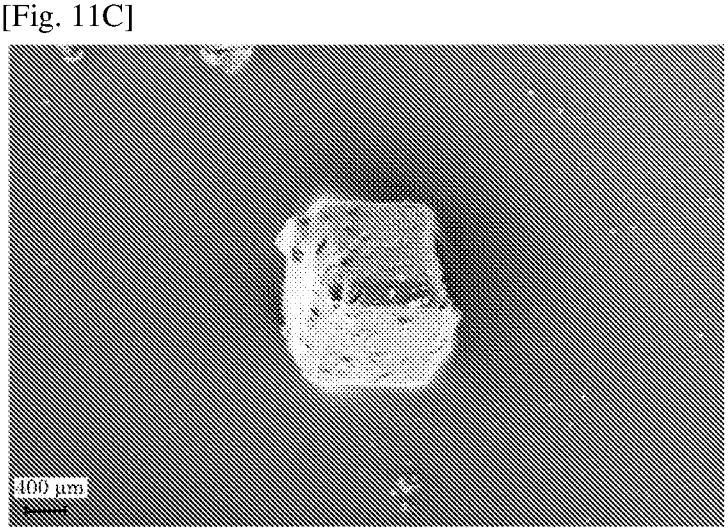
[Fig. 11D]
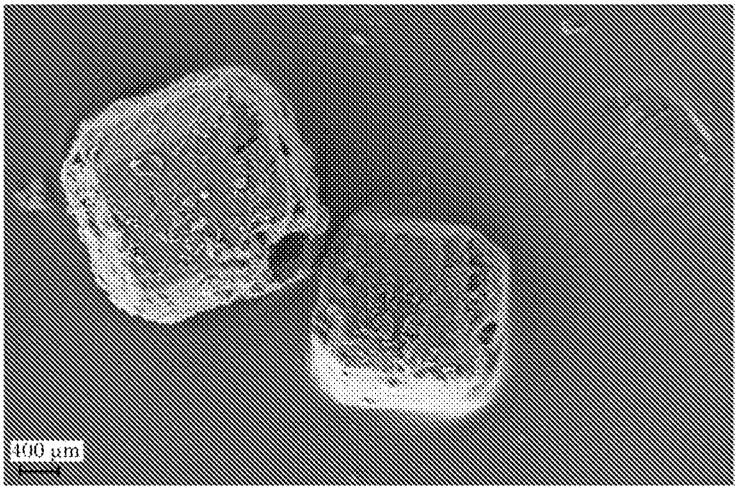

[Fig. 12]
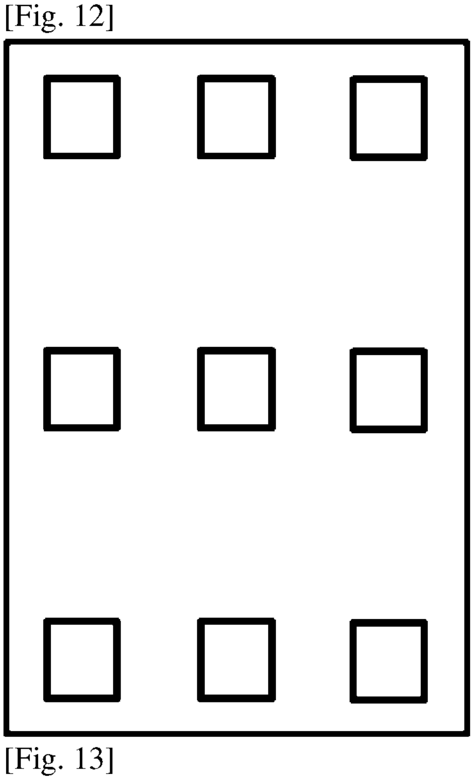
[Fig. 13]
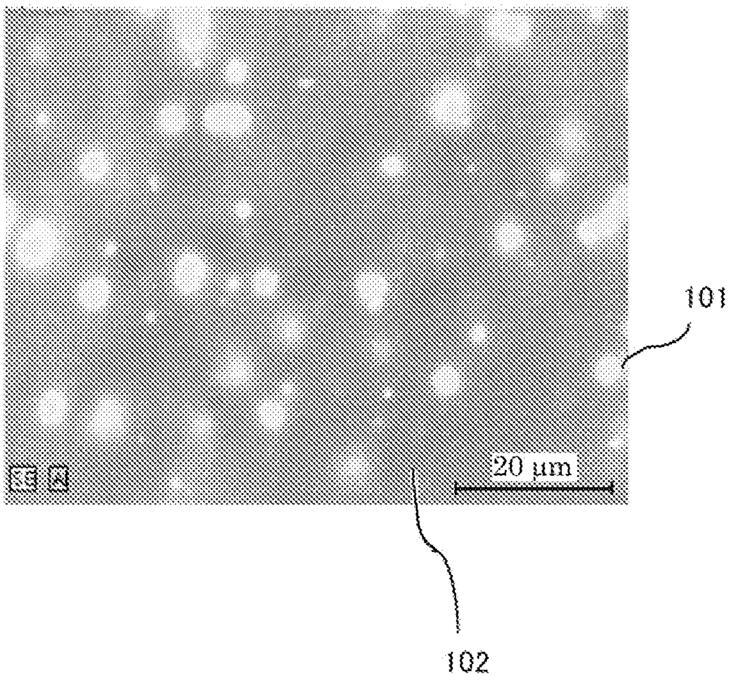

IMAGE FORMING METHOD, TONER, DEVELOPER, PRINTED PRODUCT, TONER STORAGE UNIT, AND IMAGE FORMING APPARATUS

CROSS-REFERENCE TO RELATED APPLICATIONS

This application is the National Stage entry under § 371 of International Application No. PCT/JP2021/048458, filed on Dec. 27, 2021, and which claims the benefit of priority to Japanese Patent Application No. 2021-019852, filed on Feb. 10, 2021. The content of each of these applications is hereby incorporated by reference in its entirety.

TECHNICAL FIELD

The present disclosure relates to an image forming method, a toner, a developer, a printed product, a toner storage unit, and an image forming apparatus.

BACKGROUND ART

In a process of image formation according to an electrophotographic system, electrostatic recording, or electrostatic printing, a latent image formed by electrostatic charge is formed on a photoconductor formed of a photoconductive material, a charged toner is deposited on the latent image to form a visible image, the visible image is transferred onto a recording medium, such as paper, and then the visible image is fixed to form an output image. Unlike printing machines, an electrophotographic system does not use a printing plate, and therefore the electrophotographic system is suitable for copying the small number of sheets, or copying various images. Compared with conventional printing, the electrophotographic system is an on-demand system.

Meanwhile, in addition to conventional monochrome toners and color toners, toners having various functions have been developed and made available on the market. One of such functional toner is an antibacterial toner. For example, PTL 1 to PTL 4 disclose various antibacterial toners. Use of an antibacterial toner in image formation gives an advantage that a formed image has an antibacterial effect. As a result, it can be expected that possibility of transmission of bacteria or virus to people through a printed product can be reduced, when the unlimited number of people come to contact with the printed product.

Components of such a toner and amounts of the components are carefully considered and optimized to achieve an excellent balance between properties desired for a toner, such as developing properties (e.g., chargeability, electric resistance, magneticity, and flowability), fixing properties (e.g., fixability, and coloring), storability, and handling.

CITATION LIST

Patent Literature

PTL 1: Japanese Unexamined Patent Application Publication No. 08-314179
PTL 2: Japanese Unexamined Patent Application Publication No. 2003-241414
PTL 3: Japanese Unexamined Patent Application Publication No. 2003-241423
PTL 4: Japanese Unexamined Patent Application Publication No. 2004-093784

SUMMARY OF INVENTION

Technical Problem

A toner is a group of particles having a charging function, and is produced using a binder resin, a colorant, a charge controlling agent, a release agent, a surface treating agent, a magnetic agent, etc. In the related art, there is a case that a toner may not be stably produced when a material having an antibacterial or antiviral effect is added.

Moreover, there is a case that excellent chargeability cannot be achieved, when a material having an antibacterial or antiviral effect is added. Compared to a conventional printing method using an ink, moreover, a thickness of an image formed tends to be large. Therefore, stable formation of an image having an antibacterial or antiviral effect has been desired.

An object of the present disclosure is to provide an image forming method that can stably form an antibacterial or antiviral image using a toner having excellent chargeability.

Solution to Problem

According to one aspect of the present disclosure, an image forming method includes an electrostatic latent image forming step, a developing step, a transferring step, and a fixing step. The electrostatic latent image forming step includes forming an electrostatic latent image on an electrostatic latent image bearer. The developing step includes developing the electrostatic image with a toner to form a visible image. The transferring step includes transferring the visible image onto a recording medium. The fixing step includes fixing the transferred visible image on the recording medium. The toner includes toner base particles each including a binder resin, a release agent, and particles of an inorganic antibacterial antiviral agent, and the toner satisfies all of conditions (1) to (3) below. The image forming method satisfies a relationship of $2.0X$ (micrometers)$\leq Z \leq 2.5X$ (micrometers)

where X (micrometers) is a number average particle diameter of the particles of the inorganic antibacterial antiviral agent, and Z (micrometers) is a thickness of a layer of the toner fixed on the recording medium.

Conditions (1) the number average particle diameter X of the particles of the inorganic antibacterial antiviral agent is 1.5 (micrometers)$\leq X \leq 2.5$ (micrometers), (2) $3X$ (micrometers)$\leq Y \leq 4X$ (micrometers), where Y is a weight average particle diameter of the toner base particles, and (3) an amount of the inorganic antibacterial antiviral agent in the toner is 2.8% by mass or greater, but 5.0% by mass or less.

Advantageous Effects of Invention

The present disclosure can provide an image forming method that can stably form an antibacterial or antiviral image using a toner having excellent chargeability.

BRIEF DESCRIPTION OF DRAWINGS

FIG. 1 is a schematic view illustrating an example of the image forming apparatus of the present disclosure.

FIG. 2 is a schematic view illustrating an example of the image forming apparatus of the present disclosure.

FIG. 3 is a schematic view illustrating an example of the image forming apparatus of the present disclosure.

FIG. 4 is a cross-sectional view illustrating an example of a schematic structure of a developing device in the image forming apparatus.

FIG. 5 is a cross-sectional view of a collection conveyance channel and a stirring conveyance channel at a downstream of a conveyance direction of the collection conveyance channel in an example of the image forming apparatus.

FIG. 6 is a cross-sectional view of an upstream of a conveyance direction of a supply conveyance channel in an example of the image forming apparatus.

FIG. 7 is a cross-sectional view of a downstream of a conveyance direction of a supply conveyance channel in an example of the image forming apparatus.

FIG. 8 is a schematic view illustrating a flow of a developer inside a developing device of an example of the image forming apparatus.

FIG. 9 is a cross-sectional view illustrating the same developing device at the most downstream of the conveyance direction of the supply conveyance channel.

FIG. 10 is a schematic view illustrating an example of a process cartridge.

FIG. 11A is a photograph depicting an example of an SEM image of Antibacterial Agent C.

FIG. 11B is a photograph depicting an example of another SEM image of Antibacterial Agent C.

FIG. 11C is a photograph depicting an example of an SEM image of Antibacterial Agent C.

FIG. 11D is a photograph depicting an example of an SEM image of Antibacterial Agent C.

FIG. 12 is a schematic view illustrating samples cut out for the transmittance evaluation.

FIG. 13 is a view depicting an EDX measurement result on a surface of an image formed with a deposition amount of 0.58±0.02 $mg/cm^2$ using Toner C2-3.

DESCRIPTION OF EMBODIMENTS

The toner, developer, printed product, toner storage unit, image forming apparatus, and image forming method of the present disclosure will be described with reference to drawings hereinafter. The embodiments described below shall not be construed to as limiting the scope of the present disclosure. The embodiments described below may be changed within the range a person skilled in the art can arrive through use of other embodiments, addition to the embodiments, modification to the embodiments, or omission of part of the embodiments, all of which are included in the scope of the present disclosure as long as the embodiments exhibits functions and effect of the present disclosure.

(Toner)

The toner of the present disclosure includes toner particles. Each of the toner particles includes a toner base particle, and optionally external additives deposited on a surface of the toner base particle. Each of the toner base particles includes a binder resin, a release agent, and particles of an inorganic antibacterial antiviral agent. The toner satisfies the following conditions (1) to (3):

(1) the number average particle diameter X of the particles of the inorganic antibacterial antiviral agent is 1.5 (micrometers)≤X≤2.5 (micrometers);

(2) 3X (micrometers)≤Y≤4X (micrometers), where Y is a weight average particle diameter of the toner particles; and (3) an amount of the inorganic antibacterial antiviral agent in the toner is 2.8% by mass or greater, but 5.0% by mass or less.

The present disclosure can provide a toner that can be stably produced, has excellent chargeability, and can stably form an image having an antibacterial or antiviral effect. The present disclosure can stably produce an image having a sufficient antibacterial or antiviral effect on-demand according to an electrophotographic system.

The toner of the present disclosure has an antibacterial effect or an antiviral effect. The toner may have both an antibacterial effect and an antiviral effect, or either an antibacterial effect or an antiviral effect. Moreover, the toner of the present disclosure may be also referred to as an antibacterial antiviral toner.

Use of the toner of the present disclosure is not particularly limited and may be appropriately selected. For example, an image (e.g., a color image) may be formed using the toner of the present disclosure. Alternatively, the toner of the present disclosure may be used on an image formed with other toners. A layer of the toner of the present disclosure is preferably formed on a surface of an image. In this case, antibacterial and antiviral effect is easily obtained. For example, a layer of the toner of the present disclosure is preferably formed on a layer of a color toner that is different from the toner of the present disclosure. In this case, the layer of the toner of the present disclosure preferably has high transmittance, as a color of the layer of the color toner appears vividly.

<Inorganic Antibacterial Antiviral Agent>

The toner of the present disclosure includes particles of an inorganic antibacterial antiviral agent. In the present disclosure, examples of the antibacterial antiviral agent include an antibacterial agent having an antibacterial effect, an antiviral agent having an antiviral effect, and a component having antibacterial and antiviral effects. Examples of the inorganic antibacterial antiviral agent includes antibacterial agents and antiviral agents each including an inorganic component.

Hereinafter, some embodiments may be described with an antibacterial agent as an example. Unless otherwise stated, such description also applies to an antiviral agent. Moreover, the inorganic antibacterial antiviral agent may be simply referred to as an antibacterial antiviral agent.

For example, the inorganic antibacterial antiviral agent preferably has at least one of the following properties, and the inorganic antibacterial antiviral agent is preferably used as an antibacterial agent for a developer.

(a) The inorganic antibacterial antiviral agent has excellent heat resistance and is stable at from 500 degree Celsius through 600 degrees Celsius, and is not substantially thermally decomposed at around a temperature at which a toner is produced and is used.

(b) The inorganic antibacterial antiviral agent has high safety, oral acute toxicity LD50 in mice is extremely low, i.e., 2,000 mg/kg or more, and the inorganic antibacterial antiviral agent has no or extremely weak mutagenicity and skin irritation, and has low toxicity.

(c) An antibacterial effect thereof last semi-permanently.

(d) The inorganic antibacterial antiviral agent has a wide antibacterial spectrum.

(e) The inorganic antibacterial antiviral agent has excellent characteristics, such as inhibiting microorganisms from easily attaining resistance.

The inorganic antibacterial antiviral agent is not particularly limited as long as the inorganic antibacterial antiviral agent is an inorganic material having antibacterial activities or antiviral activities, and may be appropriately selected.

Examples thereof include inorganic antibacterial agents having antibacterial activities and inorganic antiviral agents having antiviral activities.

The antibacterial agent is preferably an antibacterial agent including a metal having an antibacterial effect.

Examples of the metal having an antibacterial effect include silver, copper, zinc, platinum, nickel, and titanium oxide having photocatalytic effect. Among the above-listed examples, the antibacterial metal preferably used is silver, zinc, and titanium oxide, all of which have strong antibacterial power. The above-listed metals may be used alone, or a mixture of two or more of the above-listed metals may be used. Moreover, examples of the metal also include metal ions of the above-listed metals.

The inorganic antibacterial antiviral agent preferably includes support particles formed of alumina, zeolite, silicon-based glass, or bentonite. For example, metal ions of any of the above-listed metals are preferably carried on the support particles. Considering performances of a developer to be obtained, as the antibacterial agent including the support particles, a phosphate-based antibacterial antiviral agent, a silicate-based antibacterial antiviral agent, or a soluble glass-based antibacterial antiviral agent is used.

Examples of the phosphate-based antibacterial antiviral agent include a zirconium phosphate-based antibacterial antiviral agent where silver or zinc is bonded through ionic exchange with zirconium phosphate $ZrO(HPO_4)_2$ serving as a base (support) that is an inorganic ion exchanger. Moreover, other examples thereof include a calcium phosphate-based antibacterial antiviral agent $Ca_3(PO_4)_2$, and a calcium phosphate-based antibacterial antiviral agent where silver is bonded and adsorbed on a base (support) that is hydroxyapatite $Ca_{10}(PO_4)_6(OH)_2$.

Examples of the silicate-based antibacterial antiviral agent include a zeolite-based antibacterial antiviral agent, which uses ion exchange capability of support particles of zeolite $Na_2O \cdot Al_2O_3 \cdot 2SiO_2 \cdot 4.5H_2O$ that is a crystalline amino silicate. In the zeolite-based antibacterial antiviral agent, silver, copper, or zinc in the ionic state is safely carried in a number of pores in the zeolite particles to have sustained releasability. Therefore, the zeolite-based antibacterial antiviral agent can gradually release silver ions etc. to sustain the antibacterial effect over a long period, and has a long lasting effect. Other examples thereof include a silica gel-based antibacterial antiviral agent, where a silver thiosulfate complex is adsorbed and bonded to silica gel $SiO_2 \cdot nH_2O$ (having a fine porous structure, where the porous structure has a surface area of 450 $m^2$ or greater per 1 g).

Examples of the soluble glass-based antibacterial antiviral agent include a soluble glass-based antibacterial antiviral agent where a highly soluble glass carrier that is silicate glass $Na_2O \cdot SiO_2 \cdot B_2O_3$ and a large amount of the $B_2O_3$ component is used to carry silver, and sustained release of the silver is controlled by solubility of the glass.

As described above, the inorganic antibacterial antiviral agent stably exhibits an excellent antibacterial antiviral effect. However, it has been known that the inorganic antibacterial antiviral agent affects chargeability of the toner. In the present disclosure, therefore, the condition (1) is defined.

In the present disclosure, (1) 1.5 (micrometers)≤X≤2.5 (micrometers), where X is the number average particle diameter of the particles of the inorganic antibacterial antiviral agent.

When the number average particle diameter X is less than 1.5 micrometers, the number of the particles of the antibacterial antiviral agent in the toner base particle excessively becomes excessive, which may adversely affect the chargeability of the toner. The lower limit thereof is preferably 1.8 micrometers or greater.

When the number average particle diameter X is greater than 2.5 micrometers, it is difficult to add the sufficient amount of the antibacterial antiviral agent in the toner. Therefore, the particles of the antibacterial antiviral agent are not sufficiently dis-tributed in each toner base particle, the concentration of the antibacterial antiviral agent tends to vary as printing is repeated, and a stable antibacterial antiviral effect cannot be obtained. Moreover, electrophotographic members, such as an electrostatic latent image bearer, an intermediate transfer belt, and a fixing belt, may be easily scratched.

In the present disclosure, (2) 3X (micrometers)≤Y≤4X (micrometers), where Y is a weight average particle diameter of the toner base particles.

When the weight average particle diameter Y of the toner base particles is greater than 3 times the number average particle diameter X (3X) of the particles of the inorganic antibacterial antiviral agent, the strength of the toner base particles reduces, and the toner base particles are crashed to generate fine powder inside a developing device, to thereby cause a problem during developing. When the toner is produced by a pulverization method, therefore, the yield may be significantly reduced at the time of pulverization. When Y is smaller than 3X, it may be difficult to achieve excellent toner production yield.

When the weight average particle diameter Y of the toner is greater than 4 times the number average particle diameter X (4X) of the particles of the inorganic antibacterial antiviral agent, the antibacterial antiviral agent is not sufficiently exposed to a surface of the toner and a surface of a fixed surface, and therefore an antibacterial antiviral effect may not be sufficiently exhibited.

In the present disclosure, (3) an amount of the inorganic antibacterial antiviral agent in the toner is 2.8% by mass or greater, but 5.0% by mass or less.

When the amount of the inorganic antibacterial antiviral agent in the toner is less than 2.8% by mass, an antiviral effect may not be sufficiently obtained. When an image is formed with the toner, a state of the antibacterial antiviral agent exposed to a surface of the image is not desirable, and therefore excellent antibacterial or antiviral effect cannot be obtained stably. The lower limit of the amount of the inorganic antibacterial antiviral agent is preferably 3.5% by mass or greater.

When the amount thereof is greater than 5.0% by mass, electric properties of the toner may be adversely affected. For example, the volume resistivity value, dielectric constant, dielectric loss factor, etc. of the toner may be adversely affected. The upper limit thereof is preferably less than 4.5% by mass.

The number average particle diameter X of the inorganic antibacterial antiviral agent of the present disclosure may be measured by the following method.

A printed product that includes a laminate, in which a layer including the inorganic antibacterial antiviral agent is disposed, is vertically cut into a thin piece having a thickness of 100 micrometers or less by a knife. After embedding the cut pieces in an epoxy resin, an about 100 nm-thick ultrathin cut piece of the epoxy resin including the cut pieces of the printed product is produced by means of an ultramicrotome ULTRACUT-S(available from Leica-Camera AG). Next, the cut surface of the ultrathin cut piece is observed under a transmission electron microscope (TEM) H7000 (available from Hitachi High-Technologies Corporation) to take a digital photograph of a cross-sectional image of the layer including the inorganic antibacterial antiviral agent at the magnification of 10,000 times. The cross-sectional image is binarized into the inorganic antibacterial antiviral agent and other components, and areas thereof are calculated and analyzed by means of an image analysis software (e.g., A-Zou Kun, available from Asahi Kasei Engineering Corporation). As a result, the average particle diameter (number average particle diameter X) of the inorganic antibacterial antiviral agent in the layer including the inorganic antibacterial antiviral agent can be determined.

Regarding the aggregates of the particles of the inorganic antibacterial antiviral agent in the layer, a primary particle diameter of the primary particle in the aggregate is not regarded as one particle, a diameter of one aggregate is calculated as a particle diameter of one particle.

For example, the average particle diameter of the inorganic antiviral agent in the toner is measured in the same manner as the measurement of the average particle diameter (number average particle diameter X) of the inorganic antibacterial antiviral agent in the above-described layer of the inorganic antibacterial antiviral agent, except that after embedding the toner in an epoxy resin, the cured resin was sliced into an ultra-thin cut piece of about 100 nm by means of an ultramicrotome ULTRACUT-S (available from Leica-Camera AG).

The shapes of the particles of the inorganic antibacterial antiviral agent are not particularly limited. The shapes thereof are preferably cubes or cuboids. When the shapes thereof are cubes or cuboids, the antibacterial antiviral agent is stably exposed to a surface of an image.

The shapes of the particles of the inorganic antibacterial antiviral agent are observed, for example, under a scanning electron microscope (SEM). It is preferred that 40% or greater of the observed particles be cubes or cuboids.

The SEM images of the antibacterial agent used in Examples described later are depicted in FIGS. 11A to 11D. FIGS. 11A and 11B are the images taken with the identical scale, are taken by observing separate spots. FIGS. 11C and 11D are the images taken with the identical scale, are taken by observing separate spots. In the illustrated examples, particles of the inorganic antibacterial antiviral agent are in the shape of cubes.

<Binder Resin>

The binder resin is not particularly limited, and any of resins known in the art can be used as the binder resin. Examples of the binder resin include a styrene-based resin (e.g., styrene, α-methyl styrene, chlorostyrene, a styrene-propylene copolymer, a styrene-butadiene copolymer, a styrene-vinyl chloride copolymer, a styrene-vinyl acetate copolymer, a styrene-maleic acid copolymer, a styrene-acrylic acid ester copolymer, a styrene-methacrylic acid ester copolymer, and a styrene-acry-lonitrile-acrylic acid ester copolymer), a polyester resin, a vinyl chloride resin, a rosin-modified maleic acid resin, a phenol resin, an epoxy resin, a polyethylene resin, a polypropylene resin, an ionomer resin, a polyurethane resin, a silicone resin, a ketone resin, a xylene resin, a petroleum resin, and a hydrogenated petroleum resin. The above-listed examples may be used alone or in combination. Among the above-listed resins, a styrene-based resin including an aromatic compound as a constitutional unit and a polyester resin are preferable, and a polyester resin is more preferable.

The polyester resin is obtained through a polycondensation reaction between general alcohol and acid known in the art.

Examples of the alcohol include: diols, such as polyethylene glycol, diethylene glycol, triethylene glycol, 1,2-propyleneglycol, 1,3-propyleneglycol, 1,4-propyleneglycol, neopentyl glycol, and 1,4-butenediol; etherified bisphenols, such as 1,4-bis(hydroxymethyl)cyclohexane, bisphenol A, hydrogenated bisphenol A, poly-oxyethylated bisphenol A, and polyoxypropylated bisphenol A; divalent alcohol monomers obtained by substituting any of the above-listed diols with a saturated or unsaturated hydrocarbon group having from 3 through 22 carbon atoms; other divalent alcohol monomers; and trivalent or higher alcohol monomers, such as sorbitol, 1,2,3,6-hexanetetrol, 1,4-sorbitan, pentaerythritol, dipentaerythritol, tripentaerythritol, sucrose, 1,2,4-butanetriol, 1,2,5-pentanetriol, glycerol, 2-methylpropanetriol, 2-methyl-1,2,4-butanetriol, trimethylol ethane, trimethylol propane, and 1,3,5-trihydroxymethylbenzene. The above-listed examples may be used alone or in combination.

The acid is not particularly limited, and may be appropriately selected depending on the intended purpose. The acid is preferably carboxylic acid.

Examples of the carboxylic acid include: monocarboxylic acid, such as palmitic acid, stearic acid, and oleic acid; divalent organic acid monomers, such as maleic acid, fumaric acid, mesaconic acid, citraconic acid, terephthalic acid, cyclohexane di-carboxylic acid, succinic acid, adipic acid, sebacic acid, malonic acid, and the above-listed acids substituted with a saturated or unsaturated hydrocarbon group having from 3 through 22 carbon atoms; anhydrides of the above-listed acids; dimers of lower alkyl ester and linoleic acid; and trivalent or higher polyvalent carboxylic acid monomers, such as 1,2,4-benzenetricarboxylic acid, 1,2,5-benzenetricarboxylic acid, 2,5,7-naphthalenetricarboxylic acid, 1,2,4-naphthalenetricarboxylic acid, 1,2,4-butanetricarboxylic acid, 1,2,5-hexanetricarboxylic acid, 1,3-dicarboxyl-2-methyl-2-methylenecarboxypropane, tetra (methylenecarboxyl)methane, 1,2,7,8-octanetetracarboxylic acid empol trimer acid, and anhydrides of the above-listed acids. The above-listed examples may be used alone or in combination.

The binder resin may include a crystalline resin.

The crystalline resin is not particularly limited as long as the crystalline is a resin having crystallinity, and may be appropriately selected depending on the intended purpose. Examples thereof include a polyester resin, a polyurethane resin, a polyuria resin, a polyamide resin, a polyether resin, a vinyl resin, and a modified crystalline resin. The above-listed examples may be used alone or in combination. Among the above-listed examples, a polyester resin, a polyurethane resin, a polyuria resin, a polyamide resin, and a polyether resin are preferable, and a resin having a urethane skeleton and/or a urea skeleton is preferable because of moisture proof thereof and in-compatibility thereof with the below-described amorphous resin.

Considering fixability, the weight average molecular weight (Mw) of the crystalline resin is preferably from 2,000 through 100,000, more preferably from 5,000 through 60,000, and particularly preferably from 8,000 through 30,000. When the weight average molecular weight is 2,000 or greater, desirable hot offset resistance is obtained. When the weight average molecular weight is 100,000 or less, desirable low temperature fixability is obtained.

<Release Agent>

As the release agent, natural wax or synthetic wax may be used. The above-listed examples may be used alone or in combination.

Examples of the natural wax include: vegetable wax, such as carnauba wax, cotton wax, Japanese wax, and rice wax;

animal wax, such as bees wax, and lanolin wax; mineral wax, such as ozocerite and ceresin; and petroleum wax, such as paraffin wax, microcrystalline wax, and petrolatum wax.

Examples of the synthetic wax include: synthetic hydrocarbon wax, such as Fischer-Tropsch, and polyethylene wax; synthetic wax, such as ester wax, ketone wax, and ether wax; fatty acid amine, such as 1,2-hydroxystearic acid amide, stearic acid amide, phthalimide anhydride, and chlorinated hydrocarbon; and a low molecular weight crystalline polymer, such as a homopolymer of polyacrylate (e.g., poly-n-stearylmethacrylate, and poly-n-laurylmethacrylate) and a crystalline polymer having a long chain alkyl group as a side chain, such as a copolymer of polyacrylate (e.g., a n-stearylacrylate-ethyl methacrylate copolymer).

Among the above-listed examples, the release agent is preferably a release agent including monoester wax. Since the monoester wax has low compatibility to a typical binder resin, the monoester wax is easily bled out to surfaces of the toner particles during fixing to exhibit high releasability, and therefore both high gloss and desirable low temperature fixability can be maintained.

The monoester wax is preferably synthetic ester wax. Examples of the synthetic ester was include monoester wax synthesized from a long straight chain saturated fatty acid and long straight chain saturated alcohol. The long straight chain saturated fatty acid is preferably represented by a general formula, $C_nH_{2+1}COOH$, where n is from about 5 through about 28. The long straight chain saturated alcohol is preferably represented by $C_nH_{2+1}OH$, where n is from about 5 through about 28.

Specific examples of the long straight chain saturated fatty acid include capric acid, undecylic acid, lauric acid, tridecylic acid, myristic acid, pentadecylic acid, palmitic acid, heptadecanoic acid, tetradecanoic acid, stearic acid, nonadecanoic acid, aramonic acid, behenic acid, lignoceric acid, cerotic acid, heptacosanoic acid, montanic acid, and melissic acid. Specific examples of the long straight chain saturated alcohol include amyl alcohol, hexyl alcohol, heptyl alcohol, octyl alcohol, acryl alcohol, nonyl alcohol, decyl alcohol, undecyl alcohol, lauryl alcohol, tridecyl alcohol, myristyl alcohol, pentadecyl alcohol, cetyl alcohol, heptadecyl alcohol, stearyl alcohol, nonadecyl alcohol, eicosyl alcohol, seryl alcohol, and heptadecanol, where the above-listed alcohols may have a substituent, such as a lower alkyl group, an amino group, and halogen.

A melting point of the release agent is preferably from 50 degrees Celsius through 120 degrees Celsius. When the melting point of the release agent is within the above-mentioned numerical range, the release agent can effectively function between a fixing roller and interfaces of toner particles, and therefore hot offset resistance can be improved without applying a release agent, such as oil, onto the fixing roller. Specifically, when the melting point thereof is 50 degrees Celsius or higher, desirable heat resistant storage stability of a toner is maintained. When the melting point thereof is 120 degrees Celsius or lower, the following problem can be prevented. That is, releasability cannot be exhibited at a low temperature, and therefore a toner has poor cold offset resistance to cause a sheet to attach around a fixing device.

For example, the melting point of the release agent can be determined by measuring the maximum endothermic peak by means of a differential scanning calorimeter, TG-DSC System TAS-100 (available from Rigaku Corporation).

An amount of the release agent is preferably from 1% by mass through 20% by mass, and more preferably from 3% by mass through 10% by mass, relative to the binder resin. When the amount thereof is 1% by mass or greater, an effect of offset resistance is sufficiently obtained. When the amount thereof is 20% by mass or less, desirable transfer performance and durability can be obtained.

Moreover, an amount of the monoester wax is preferably from 4 parts by mass through 8 parts by mass, and more preferably from 5 parts by mass through 7 parts by mass, relative to 100 parts by mass of the toner. When the amount of the monoester wax is 4 parts by mass or greater, the monoester wax is sufficiently bled out to surfaces of toner particles during fixing, desirable release properties are obtained, and therefore desirable gloss, low temperature fixability, and hot offset resistance can be obtained. When the amount thereof is 8 parts by mass or less, an appropriate amount of the release agent precipitated on the surfaces of the toner particles is maintained, and therefore desirable storage stability of the toner is obtained, and filming of the to a photoconductor etc. does not occur.

The toner of the present disclosure preferably further includes a wax dispersing agent. The dispersing agent is preferably a copolymer composition including at least styrene, butyl acrylate, and acrylonitrile as monomer units, or a polyethylene adduct of the copolymer composition.

An amount of the wax dispersing agent is preferably 7 parts by mass or less relative to 100 parts by mass of the toner. Since the wax dispersing agent is included, an effect of dispersing wax is obtained, and therefore improvement of storage stability of the toner is expected regardless of a production method of the toner. Moreover, diameters of wax particles become small due to the effect of dispersing wax, and therefore filming of the toner to a photoconductor etc. can be prevented. When the amount of the wax dispersing agent is 7 parts by mass or less, the following problems can be prevented. Namely, a non-compatible component to a polyester resin increases to reduce glossiness, dispersibility of wax is excessively high to reduce bleeding of the wax onto surfaces of toner particles during fixing, through filming resistance improves, and therefore desirable low temperature fixability and hot offset resistance are not obtained.

<Other Components>

The above-mentioned other components are not particularly limited, as long as the components are components typically included in a toner, and may be appropriately selected depending on the intended purpose. Examples thereof include a charge controlling agent, and external additives.

<<Charge Controlling Agent>>

The charge controlling agent may be any of charge controlling agents known in the art. Examples thereof include a nigrosine-based dye, a triphenylmethane-based dye, a chrome-containing metal complex dye, a molybdic acid chelate pigment, a rhodamine-based dye, alkoxy-based amine, a quaternary ammonium salt (including fluorine-modified quaternary ammonium salt), alkylamide, phosphorus or a compound thereof, a fluorosurfactant, a metal salt of salicylic acid, and a metal salt of a salicylic acid derivative. The above-listed examples may be used alone or in combination.

The charge controlling agent may be appropriately synthesized for use, or selected from commercial products. Examples of the commercial products include: BONTRON 03, BONTRON P-51, BONTRON S-34, E-82, E-84, and E-89 (all available from ORIENT CHEMICAL INDUSTRIES CO., LTD); TP-302, TP-415, Copy Charge PSY VP2038, Copy Blue PR, Copy Charge NEG VP2036, and Copy Charge NX VP434 (all available from Hoechst AG); and LRA-901, and LR-147 (available from Japan Carlit Co., Ltd.).

An amount of the charge controlling agent is appropriately selected depending on a type of the binder resin for use, presence or absence of optionally used additives, and a toner production method including a dispersing method. The amount thereof is preferably from 0.1 parts by mass through 5 parts by mass, and more preferably from 0.2 parts by mass through 2 parts by mass, relative to 100 parts by mass of the binder resin. When the amount thereof is 5 parts by mass or less, the following problems are prevented. That is, chargeability of a resultant toner is excessively large to reduce an effect of the charge controlling agent, and electrostatic attraction with a developing roller increases to impair flowability of a resultant developer, or reduce image density.

Moreover, use of a trivalent or higher metal salt, among the charge controlling agent, can control thermal properties of a resultant toner. Since the metal salt is included, a cross-linking reaction with an acid group of a binder resin is progressed during fixing to form a weak three-dimensional crosslink, and therefore hot offset resistance can be obtained with maintaining low temperature fixability.

Examples of the metal salt include metal salts of a salicylic acid derivative, and metal salts of acetyl acetonate. The metal is not particularly limited as long as the metal is a trivalent or higher polyvalent ionic metal, and may be appropriately selected depending on the intended purpose. Examples thereof include iron, zirconium, aluminium, titanium, and nickel. Among the above-listed examples, a trivalent or higher salicylic acid metal compound is preferable.

An amount of the metal salt is not particularly limited, and may be appropriately selected depending on the intended purpose. For example, the amount of the metal salt is preferably from 0.5 parts by mass through 2 parts by mass, and more preferably from 0.5 parts by mass through 1 part by mass, relative to 100 parts by mass of the toner. When the amount thereof is 0.5 parts by mass or greater, a resultant toner is prevented from deteriorating hot offset resistance thereof. When the amount thereof is 2 parts by mass or less, a resultant toner is prevented from deteriorating gloss thereof.

<<External Additives>>

The external additives are added for facilitating flowability, developing performance, and chargeability. The external additives are not particularly limited, and may be appropriately selected depending on the intended purpose. Examples thereof include inorganic particles and polymer particles.

Examples of the inorganic particles include silica, alumina, titanium oxide, barium titanate, magnesium titanate, calcium titanate, strontium titanate, zinc oxide, tin oxide, silica sand, clay, mica, wollastonite, diatomaceous earth, chromium oxide, cerium oxide, red iron oxide, antimony trioxide, magnesium oxide, zirconium oxide, barium sulfate, barium carbonate, calcium carbonate, silicon carbide, and, silicon nitride. The above-listed examples may be used alone or in combination.

Examples of the polymer particles include: polymer particles formed by soap-free emulsion polymerization, suspension polymerization, or dispersion polymerization, such as polystyrene, methacrylic acid ester or acrylic acid ester copolymers; polycon-densation-based polymer particles, such as silicone, benzoguanamine, and nylon; and polymer particles of a thermoset resin.

A surface treatment may be performed on the external additives with a surface treating agent to enhance hydrophobicity. As a result, reduction in flowability or chargeability in a high humidity environment can be prevented.

Examples of the surface treating agent include a silane coupling agent, a silylating agent, a silane coupling agent having a fluoroalkyl group, an organic titanate-based coupling agent, an aluminium-based coupling agent, silicone oil, and modified silicone oil.

The primary particle diameter of the external additives is preferably from 5 nm through 2 micrometers, and more preferably from 5 nm through 500 nm. The BET specific surface area of the external additives is preferably from 20 $m^2/g$ through 500 $m^2/g$.

An amount of the external additives is preferably from 0.01% by mass through 5% by mass, and more preferably from 0.01% by mass through 2.0% by mass, relative to the toner.

<<Cleaning Improving Agent>>>

The cleaning improving agent is added for removing a developer remained on a photoconductor or a primary transfer member after transferring. Examples of the cleaning improving agent include: fatty acid (e.g., stearic acid) metal salts, such as zinc stearate, and calcium stearate; and polymer particles produced by soap-free emulsion polymerization, such as polymethyl methacrylate particles, and polystyrene particles. The polymer particles are preferably polymer particles having a relatively narrow particle size distribution, and the volume average particle diameter of from 0.01 micrometers through 1 micrometer.

<Toner Set>

The toner of the present disclosure may be used independently to form an image, or may be used in combination with another toner, e.g., a color toner, to form an image. An antibacterial antiviral function can be imparted to the printed product by forming an image using the toner of the present disclosure. As described above, a layer of the toner of the present disclosure is preferably formed on a layer of another toner (e.g., a color toner). As a result, antibacterial antiviral effects can be easily secured.

As an example of a toner that can be used with the toner of the present disclosure as a set, a color toner will be described hereinafter. In order to distinguish the toner of the present disclosure from the color toner, the toner of the present disclosure may be referred to as an antibacterial antiviral toner.

<<Color Toner>>

The color toner include toner base particles, and each of the toner base particles include a binder resin, and a colorant, and may further include other components according to necessity. As the above-mentioned other components, the same components as the above-mentioned other components for the antibacterial antiviral toner may be used.

The color toner is preferably selected from a cyan toner, a magenta toner, a yellow toner, and a black toner, and is more preferably a cyan toner, a magenta toner, a yellow toner, or a black toner. Other examples thereof include a white toner.

—Binder Resin—

The binder resin included in the color toner is not particularly limited, and may be appropriately selected depending on the intended purpose. The binder resin preferably includes a gel. The gel fraction is preferably 0.5% by mass or greater but 10% by mass or less, relative to the binder resin.

Even when the binder resin does not include the gel, the binder resin used in the color toner preferably includes a polymer having a weight average molecular weight of 100,000 or greater. When the binder resin includes the gel or the polymer having the weight average molecular weight of 100,000 or greater, hot offset can be prevented.

As the binder resin included in the color toner, any of the binder resins listed in the above-described antibacterial antiviral toner may be used.

—Colorant—

Examples of the colorant include naphthol yellow S, Hansa yellow (10G, 5G and G), cadmium yellow, yellow iron oxide, yellow ocher, yellow lead, titanium yellow, polyazo yellow, oil yellow, Hansa yellow (GR, A, RN and R), pigment yellow L, benzidine yellow (G and GR), permanent yellow (NCG), vulcan fast yellow (5G, R), tartrazine lake, quinoline yellow lake, anthrasan yellow BGL, isoindolinon yellow, red iron oxide, red lead, lead vermilion, cadmium red, cadmium mercury red, antimony vermilion, permanent red 4R, parared, fiser red, parachloroorthonitro aniline red, lithol fast scarlet G, brilliant fast scarlet, brilliant carmine BS, permanent red (F2R, F4R, FRL, FRLL and F4RH), fast scarlet VD, vulcan fast rubin B, brilliant scarlet G, lithol rubin GX, permanent red F5R, brilliant carmine 6B, pigment scarlet 3B, Bordeaux 5B, toluidine Maroon, permanent Bordeaux F2K, Helio Bordeaux BL, Bordeaux 10B, BON maroon light, BON maroon medium, eosin lake, rhodamine lake B, rhodamine lake Y, alizarin lake, thioindigo red B, thioindigo maroon, oil red, quinacridone red, pyrazolone red, polyazo red, chrome vermilion, benzidine orange, perinone orange, oil orange, cobalt blue, cerulean blue, alkali blue lake, peacock blue lake, Victoria blue lake, metal-free phthalocyanine blue, phthalocyanine blue, fast sky blue, indanthrene blue (RS and BC), indigo, dioxane violet, anthraquinone violet, chrome green, zinc green, viridian, emerald green, pigment green B, naphthol green B, green gold, acid green lake, malachite green lake, phthalocyanine green, anthraquinone green, titanium oxide, zinc flower, lithopone, perylene black, perinone black, and a mixture thereof. The above-listed examples may be used alone or in combination.

In case of process color toners, the following colorants are preferably used for black, cyan, magenta, and yellow.

For black, carbon black is preferably used.

For cyan, C.I. pigment blue 15:3 is preferably used.

For magenta, C.I. pigment red 122 and C.I. pigment red 269 are preferably used.

For yellow, C.I. pigment yellow 74, C.I. pigment yellow 155, C.I. pigment yellow 180, and C.I. pigment yellow 185 are preferably used.

The above-listed colorants may be used alone or in combination.

An amount of the colorant included in the color toner may be appropriately selected.

<Toner Particle Diameter>

As described above, it is desired that the number average particle diameter X and weight average particle diameter Y of the antibacterial antiviral agent satisfy the condition (2) above. The weight average particle diameter Y of the toner (antibacterial antiviral toner) of the present disclosure is preferably from 5 micrometers through 9 micrometers, and is more preferably from 6 micrometers through 8 micrometers. When the weight average particle diameter Y of the toner (antibacterial antiviral toner) of the present disclosure is smaller than 5 micrometers, a problem may be caused in the image formation process, such as developing, transferring, and cleaning, due to adhesion of the toner. When the weight average particle diameter Y is greater than 9 micrometers, a deposition amount of the toner used to over the entire surface of the base is large, when the toner is used to output a solid image covering the entire surface of the base (may be also referred to as a recording medium).

The weight average particle diameter of the color toner is preferably from 4 micrometers through 7 micrometers, and more preferably from 5 micrometers through 6 micrometers. When the weight average particle diameter of the color toner is within the above-mentioned range, fine dots of 600 dpi or greater are reproduced, and a high quality image can be obtained. This is because the particle diameter of the toner particles is sufficiently small relative to the fine latent image dot, and therefore excellent dot reproducibility can be achieved.

When the weight average particle diameter (D4) of the color toner is 4 micrometers or greater, moreover, undesirable phenomena, such as low transfer efficiency and insufficient blade cleaning performance, can be prevented. When the weight average particle diameter (D4) of the color toner is 7 micrometers or less, image information is not disturbed by contaminating the image before fixing with the color toner, and scattering of letters or lines can be suppressed.

Moreover, the ratio (D4/D1) of the weight average particle diameter (D4) of the color toner to the number average particle diameter (D1) of the toner is preferably from 1.00 through 1.40, and more preferably from 1.05 through 1.30. A value of the (D4/D1) being closer to 1.00 means the sharper particle size distribution.

The toner having the small particle diameters and narrow particle size distribution as described above has a uniform charging amount distribution of the toner, and therefore an image having high quality with less background deposition can be obtained, and moreover a transfer ratio can be made high in an electrostatic transfer system.

In a full-color image forming method where a multicolor image is formed by super-imposing toner images of different colors, an amount of the toner deposited on paper is large compared to a monochromic image forming method where it is not necessary to superimpose toner images of different colors because an image is formed with only a single color of a black toner. Specifically, an amount of the toner used for developing, transferred and fixed increases, and therefore the above-described problems, such as deterioration of transfer efficiency, deterioration of blade cleaning performance, scattering of characters or lines, and deterioration of image quality such as background deposition, tend to occur. Accordingly, it is important to control the weight average particle diameter (D4) and the ratio (D4/D1) of the weight average particle diameter (D4) to the number average particle diameter (D1).

A measurement of the particle size distribution of the toner particles can be performed by means of a measuring device for a particle size distribution of toner particles according to a coulter counter method. Examples of the device include Coulter Counter TA-IT and Coulter Multisizer TT (both available from Beckman Coulter Inc.).

A specific measurement method is as described below.

First, 0.1 mL through 5 mL of a surfactant (e.g., alkyl benzene sulfonate) serving as a dispersant is added into 100 mL through 150 mL of an electrolytic aqueous solution. The electrolytic aqueous solution is prepared as an about 1% NaCl aqueous solution using grade-1 sodium chloride. Examples of the electrolytic aqueous solution include ISOTON-II (available from Beckman Coulter, Inc.).

Next, 2 mg through 20 mg of a measurement sample is added to the resultant solution. The electrolytic solution to which the sample is suspended is subjected to a dispersion treatment for about 1 minute through about 3 minutes by means of an ultrasonic wave disperser. The resultant dispersion is provided to the measurement device with an aperture of 100 micrometers to measure a weight and numbers of toner particles or toner to thereby calculate a weight distribution and a number distribution. A weight average particle diameter (D4) and a number average particle diameter (D1) of the toner can be determined from the obtained distributions.

As channels, the following 13 channels are used: 2.00 micrometers or greater but less than 2.52 micrometers; 2.52 micrometers or greater but less than 3.17 micrometers; 3.17 micrometers or greater but less than 4.00 micrometers; 4.00 micrometers or greater but less than 5.04 micrometers; 5.04 micrometers or greater but less than 6.35 micrometers; 6.35 micrometers or greater but less than 8.00 micrometers; 8.00 micrometers or greater but less than 10.08 micrometers; 10.08 micrometers or greater but less than 12.70 micrometers; 12.70 micrometers or greater but less than 16.00 micrometers; 16.00 micrometers or greater but less than 20.20 micrometers; 20.20 micrometers or greater but less than 25.40 micrometers; 25.40 micrometers or greater but less than 32.00 micrometers; and 32.00 micrometers or greater but less than 40.30 micrometers. The target particles for the measurement are particles having the diameters of 2.00 micrometers or greater but less than 40.30 micrometers.

<Production Method of Toner>

Any of methods known in the art, such as a melt kneading-pulverization method, and a polymerization method, may be applied for the production method of the toner of the present disclosure. The same production method may be used as the production method of the color toner and the production method of the antibacterial antiviral toner. Alternatively, the production method of the color toner and the production method of the antibacterial antiviral toner may use mutually different production methods. For example, a color toner may be produced by a polymerization, and an antibacterial antiviral toner may be produced by a melt kneading-pulverization method.

<<Melt Kneading-Pulverization Method>>

For example, the melt kneading-pulverization method may include the following production steps:

(1) melt-kneading at least a binder resin, an antibacterial antiviral agent or a colorant, and a release agent;

(2) pulverizing/classifying the melt-kneaded toner composition; and (3) externally adding inorganic particles.

The fine powder generated in the (2) pulverization/classification step is preferably kneaded again as a raw material for the (1) melt-kneading step considering cost efficiency.

As a kneader used for the kneading, an enclosed kneader, a single or twin-screw extruder, or an open-roll kneader may be used. Examples of the kneader include KRC cokneader (available from KURIMOTO, LTD.), Buss Cokneader (available from Buss A.G.), TEM extruder (available from Toshiba Machine Co., Ltd.), TEX twin-screw extruder (available from KOBE STEEL, LTD.), PCM kneader (available from Ikegai, Ltd.), a three-roll mill, a mixing roll mill, a kneader (available from Inoue Mfg. Inc.), Kneadex (available from NIPPON COLE & ENGINEERING CO., LTD.), a MS pressure kneader, a kneader-ruder (available from Moriyama Company, Ltd.), and Banbury Mixer (available from Kobe Steel, Ltd.).

Examples of the pulverizer include a counter jet mill, a micron jet, an inomizer (available from Hosokawa Micron Corporation), IDS mill, PJM jet pulverizer (available from Nippon Pneumatic Mfg. Co., Ltd.), a cross jet mill (available from KURIMOTO, LTD.), Ulmax (available from Nisso Engineering Co., Ltd.), SK Jet-O-Mill (available from Seishin Enterprise Co., Ltd.), Clipton (available from Kawasaki Heavy Industries, Ltd.), Turbo Mill (available from Turbo Kogyo Co., Ltd.), and Super Rotor (available from Nisshin Engineering Inc.).

Examples of the classifier include Classiel, Micron Classifier, Specific Classifier (available from Seishin Enterprise Co., Ltd.), turbo Classifier (available from Nisshin Engineering Inc.), Micron Separator, Turboplex (ATP), TSP Separator (available from Hosokawa Micron Corporation), Elbow-jet (available from Nittetsu Mining Co., Ltd.), Dispersion Separator (available from Nippon Pneumatic Mfg. Co., Ltd.), and YM Microcut (available from Uras Techno Co., Ltd.).

Examples of a sieving device used for sieving coarse particles include Ultrasonic (available from KOEI SANGYO CO., LTD.), resonasieve, Gyro-Sifter (TOKUJU CORPORATION), a vibrasonic system (available from Dalton Ltd.), Sonicreen (available from SINTOKOGIO, LTD.), Turboscreener (available from Turbo Kogyo Co., Ltd.), Microsifter (available from MAKINO Mfg. Co. Ltd.), and a circular vibrating screen.

<<Polymerization Method>>

As the polymerization method, any of methods known in the art may be used. For example, the polymerization method is performed in the following manner. First, the colorant, binder resin, and release agent are dispersed in an organic solvent to prepare a toner material liquid (i.e., an oil phase). An isocyanate group-containing polyester prepolymer (A) is preferably added to the toner material liquid to react the polyester prepolymer during granulation so that a resultant toner includes a urea-modified polyester resin.

Next, the toner material liquid is emulsified in an aqueous medium in the presence of a surfactant, and resin particles.

An aqueous solvent is used in the aqueous medium. The aqueous solvent may be water alone. Alternatively, the aqueous solvent includes an organic solvent, such as alcohol.

An amount of the aqueous solvent used relative to 100 parts by mass of the toner material solution is typically preferably from 50 parts by mass through 2,000 parts by mass, and more preferably from 100 parts by mass through 1,000 parts by mass.

The resin particles are not particularly limited as long as the resin particles are particles of a resin capable of forming aqueous dispersed elements, and may be appropriately selected depending on the intended purpose. Examples of the resin include a vinyl-based resin, a polyurethane resin, an epoxy resin, and a polyester resin.

After the dispersion, the organic solvent is removed from the emulsified dispersed elements (i.e., a reaction element), followed by washing and drying the resultant, to thereby obtain toner base particles.

(Developer)

The toner (antibacterial antiviral toner) of the present disclosure may be used for a one-component developer or two-component developer. The color toner etc. are similarly used for a one-component developer or two-component developer.

When the toner of the present disclosure is used for a two-component developer, the toner is mixed with a magnetic carrier. As a blending ratio of the carrier and the toner in the developer, the amount of the toner is preferably from 1 part by mass through 10 parts by mass relative to 100 parts by mass of the carrier.

As the magnetic carrier, any of magnetic carrier known in the art can be used. Examples of the magnetic carrier include iron powder, ferrite powder, magnetite powder, and magnetic resin carrier, each having particle diameters of from about 20 micrometers through about 200 micrometers.

As the magnetic carrier, coated magnetic carrier may be used. Examples of a coating material for coating the magnetic carrier include: amino-based resins, such as urea-formaldehyde resins, melamine resins, benzoguanamine resins, urea resins, polyamide resins, and epoxy resins; polyvinylidene-based resins, such as polyvinyl; polystyrene-based resins, such as acrylic resins, polymethyl methacrylate resins, polyacrylonitrile resins, polyvinyl acetate resins, polyvinyl alcohol resins, polyvinyl butyral resins, polystyrene resins, and styrene-acryl copolymer resins; halogenated olefin resins, such as polyvinyl chloride; polyester-based resins, such as polyethylene tetraphthalate resins and polybutylene tetraphthalate resins; polycarbonate-based resins; polyethylene resins; polyvinyl fluoride resins; polyvinylidene fluoride resins; polytrifluoroethylene resins; polyhexafluoropropylene resins; copolymers of vinylidene fluoride and an acryl monomer; copolymer of vinylidene fluoride and vinyl fluoride; fluoroterpolymers, such as a terpolymer of tetrafluoroethylene, vinylidene fluoride, and a non-fluoromonomer; and silicone resins.

Optionally, conductive powder etc. may be added to the coating resin. As the conductive powder, metal powder, carbon black, titanium oxide, tin oxide, zinc oxide, etc. can be used. The conductive powder is preferably conductive powder having an average particle diameter of 1 micrometer or smaller. When the average particle diameter of the conductive powder is 1 micrometer or smaller, a problem that it is difficult to control electric resistance can be prevented.

(Image Forming Method and Image Forming Apparatus)

The image forming method of the present disclosure includes an electrostatic latent image forming step, a developing step, a transferring step, and a fixing step. The electrostatic latent image forming step includes forming an electrostatic latent image on an electrostatic latent image bearer. The developing step includes developing the electrostatic latent image with a toner to form a visible image. The transferring step includes transferring the visible image onto a recording medium. The fixing step includes fixing the transferred visible image on the recording medium. The toner is the toner of the present disclosure. The image forming method may further include other steps according to the necessity.

The image forming apparatus includes an electrostatic latent image bearer, an electrostatic latent image forming unit configured to form an electrostatic latent image on the electrostatic latent image bearer, a developing unit configured to develop the electrostatic latent image with a toner to form a visible image, a transferring unit configured to transfer the visible image onto a recording medium, and a fixing unit configured to fix the transferred visible image on the recording medium. The toner is the toner of the present disclosure. The image forming apparatus may further include other units according to the necessity.

The image forming method and image forming apparatus of the present disclosure may further use a toner that is different from the toner (the antibacterial antiviral toner) of the present disclosure. For example, the image forming method and image forming apparatus may use the antibacterial antiviral toner and a color toner. A visible image formed with the antibacterial antiviral toner may be referred to as an antibacterial antiviral toner image, and a visible image formed with a color toner may be referred to as a color toner image.

Regardless of the presence of a color image, in the image forming method and image forming apparatus, the antibacterial antiviral toner image is preferably a solid image formed on an entire outermost surface of a recording medium. The surface on which the antibacterial antiviral toner layer is not formed may not have an antibacterial antiviral effect, and bacteria or virus may grow on the surface on which the antibacterial antiviral toner layer is not formed.

Moreover, the image forming method and image forming apparatus of the present disclosure satisfy $2.0X \leq Z \leq 2.5X$ (micrometers) where X is the number average particle diameter (micrometers) of the particles of the inorganic antibacterial antiviral agent and Z is a thickness (micrometers) of a layer of the toner fixed in the recording medium.

When the thickness Z (micrometers) is smaller than 2.0X (micrometers), a resultant solid image may contain fine blank spots where a toner is not deposited. When the thickness Z is greater than 2.0X (micrometers), the antibacterial antiviral agent is not easily exposed to a surface of the layer, and therefore an antibacterial antiviral function may be unevenly exhibited.

In order to adjust the thickness Z (micrometers) of the toner layer on the recording medium to the range of $2.0X \leq Z \leq 2.5X$ (micrometers), for example, image formation is performed with adjusting developing conditions to adjust a deposition amount of the antibacterial antiviral toner for image formation.

A region for forming a layer of the antibacterial antiviral toner may be appropriately changed. A preferable embodiment is that a layer of a color toner is formed on a recording medium, and a layer of an antibacterial antiviral toner is formed on an entire area of the recording medium over the layer of the color toner. Since the layer of the antibacterial antiviral toner is formed on the entire surface of the recording medium, there is no region where the antibacterial antiviral function is not exhibited, and therefore an antibacterial antiviral effect can be improved.

In the image forming method and image forming apparatus of the present disclosure, an amount of the inorganic antibacterial antiviral agent per unit image area is preferably 2 $g/cm^2$ or greater but 22 $g/cm^2$ or less. When the amount thereof is within the above-mentioned range, excellent transmittance of the antibacterial antiviral toner layer can be achieved. When the amount of the inorganic antibacterial antiviral agent per unit image area is greater than the predetermined amount, transmittance of the antibacterial antiviral toner layer may become low.

<Electrostatic Latent Image Bearer>

A material, shape, structure, size, etc. of the electrostatic latent image bearer (may be referred to as an "electrophotographic photoconductor," a "photoconductor," or an "image bearer" hereinafter) are not particularly limited, and may be appropriately selected from those known in the art. Examples of the shape of the image bearer include a drum shape, and a belt shape. Examples of the material of the image bearer include: inorganic photoconductors, such as amorphous silicon, and selenium; and organic photoconductors (OPC), such as polysilane, and phthalopolymethine.

<Electrostatic Latent Image Forming Step and Electrostatic Latent Image Forming Unit>

The electrostatic latent image forming step is a step including forming an electrostatic latent image on an electrostatic latent image bearer.

For example, formation of the electrostatic latent image can be performed by uniformly charging a surface of the electrostatic latent image bearer, followed by exposing the surface of the electrostatic latent image bearer to light imagewise, and can be performed by the electrostatic latent image forming unit.

For example, the electrostatic latent image forming unit includes a charging unit (charger) configured to uniformly charge a surface of the electrostatic latent image bearer, and an exposing unit (exposing device) configured to expose the surface of the electrostatic latent image bearer to light imagewise.

For example, the charging can be performed by applying a voltage to the surface of the electrostatic latent image bearer using the charger.

The charger is not particularly limited, and may be appropriately selected depending on the intended purpose. Examples of the charger include: contact chargers known in the art per se, such as chargers equipped with a conductive or semiconductive roller, brush, film, or rubber blade; and non-contact chargers using corona discharge, such as corotron and scorotron.

The charger is preferably arranged in contact with or without contact with the electrostatic latent image bearer, and is preferably configured to apply superimposed direct voltage and alternating voltage to charge a surface of the electrostatic latent image bearer.

Moreover, the charger is preferably a charging roller arranged adjacent to the electrostatic latent image bearer in a non-contact manner via a gap tape, and configured to apply superimposed direct voltage and alternating voltage to charge a surface of the electrostatic latent image bearer.

For example, the exposing may be performed by exposing the charged surface of the electrostatic latent image bearer to light imagewise using the deposing device.

The exposing device is not particularly limited as long as the exposing device is capable of applying light corresponding to a shape of an image to be formed to the electrostatic latent image bearer to expose the surface of the electrostatic latent image bearer charged by the charger with the light. The exposing device may be appropriately selected depending on the intended purpose. Examples of the exposing device include various exposing devices, such as reproduction optical exposing devices, rod-lens-array exposing devices, laser optical exposing devices, and liquid crystal shutter optical exposing devices.

In the present disclosure, a back light system may be employed. The back light system is a system where imagewise exposure is performed from a back side of the electrostatic latent image bearer.

<Developing Step and Developing Unit>

The developing step includes developing the electrostatic latent image with a toner to form a visible image (i.e., a toner image).

The developing unit is a unit configured to develop the electrostatic latent image with a toner to form a visible image (i.e., a toner image).

As described above, for example, a toner image may be formed with the antibacterial antiviral toner or color toner by the developing unit in the developing step. As the color toner, for example, a plurality of color toners having mutually different colors may be used. A set of the color toners may be referred to as a color toner set. For example, the toner image may be formed by developing the electrostatic latent image with the antibacterial antiviral toner or color toner set, and can be performed by the developing unit.

The developing unit (may be referred to as a "developer depositing unit" hereinafter) is preferably a unit accommodating the antibacterial antiviral toner or each of the color toners of the color toner set, and including at least a developing device capable of depositing the toner directly or indirectly on the electrostatic latent image. The developing unit is more preferably a developing device including a toner stored container.

The developing device may be a developing device for a single color, or a developing device for multiple colors. Preferable examples thereof include a developing device including a stirrer configured to stir and charge each toner, and a magnetic roller that is rotatable.

Inside the developing device, for example, the toner and the carrier are mixed and stirred to charge the toner owing to frictions caused by the mixing and stirring. The charged toner is held on a surface of the rotating magnetic roller in the form of a brush to thereby form a magnetic brush. The magnetic roller is disposed near the electrostatic latent image bearer (i.e., a photoconductor), and therefore part of the toner constituting the magnetic brush formed on the surface of the magnetic roller is transferred onto the surface of the electrostatic patent image bearer (i.e., the photoconductor) by electric suction force. As a result, the electrostatic latent image is developed with the toner to form a toner image formed of the toner on the surface of the electrostatic latent image bearer (i.e., the photoconductor).

For example, the toner image includes an antibacterial antiviral toner formed with the antibacterial antiviral toner and a color toner image formed with the color toner.

Examples of colors constituting the color toner include a set of 4 colors including black (Bk), cyan (C), magenta (M), and yellow (Y), a set of 3 colors including cyan (C), magenta (M), and yellow (Y), and a single color of black (Bk).

Among the above-listed examples, a 4-color toner set is preferable as the 4-color toner set is a color toner set that can be mounted in a general electrophotographic image forming apparatus for 4 colors.

<Fixing Step and Fixing Unit>

The fixing step is a step including fixing the transferred visible image on the recording medium. The fixing step may be performed every time a developer of each color is transferred to the recording medium, or may be performed once on the developers of all colors in the state where all the colors are superimposed.

The fixing unit is not particularly limited as long as the fixing unit is a unit configured to fix the transferred visible image on the recording medium, and may be appropriately selected depending on the intended purpose. The fixing unit is preferably any of heat-pressure units known in the art. Examples of the heat-pressure unit include a combination of a heat roller and a pressure roller, and a combination of a heat roller, a pressure roller, and an endless belt.

The fixing unit is preferably a unit including a heater equipped with a heating element, a film to be in contact with the heater, and a press member configured to press against the heater via the film, and configured to pass a recording medium to which an unfixed image is formed through a gap between the film and the pressure member to heat and fix the image. Generally, the heating performed by the heat-pressure member is preferably performed at from 80 degrees Celsius through 200 degrees Celsius.

In the present disclosure, a photo fixing device known in the art can be used together with or instead of the fixing step and the fixing unit depending on the intended purpose.

<Other Steps and Other Units>

Examples of the above-mentioned other steps include a charge-eliminating step, a cleaning step, a recycling step, and a controlling step.

The charge-eliminating step is a step including applying charge-elimination bias to the electrostatic latent image bearer to eliminate the charge of the electrostatic latent image bearer. The charge-eliminating step is suitably performed by a charge-eliminating unit.

The charge-eliminating unit is not particularly limited as long as the charge-eliminating unit is capable of applying charge-elimination bias to the electrostatic latent image bearer. The charge-eliminating unit is appropriately selected from charge-eliminating devices known in the art. Preferable examples thereof include a charge-elimination lamp.

The cleaning step is a step including removing the toner remained on the electrostatic latent image bearer. The cleaning step can be suitably performed by a cleaning unit.

The cleaning unit is not particularly limited as long as the cleaning unit is capable of removing the toner remained on the electrostatic latent image bearer. The cleaning unit can be appropriately selected from cleaners known in the art. Examples of the cleaning unit include a magnetic brush cleaner, an electrostatic brush cleaner, a magnetic roller cleaner, a blade cleaner, a brush cleaner, and a web cleaner.

The recycling step is a step including recycling the toner removed in the recycling step for the developing unit. The recycling step can be suitably performed by a recycling unit. The recycling unit is not particularly limited. Examples of the recycling unit include conveying units known in the art.

The controlling step is a step including controlling each step. The controlling step can be suitably performed by a controlling unit.

The controlling unit is not particularly limited as long as the controlling unit can control operation of each unit, and may be appropriately selected depending on the intended purpose. Examples of the controlling unit include devices, such as a sequencer and a computer.

The image forming method and image forming apparatus of the present disclosure will be described with reference to drawings.

FIG. 1 is a view illustrating an entire structure of the image forming apparatus A depicted as an example. Image data sent to an image processing unit (referred to as "IPU" hereinafter) (14) is used to create 5 image signals of yellow (Y), magenta (M), cyan (C), black (Bk), and antibacterial antiviral (Abv).

Next, the image processing unit transmits each image signal of Y, M, C, Bk, and Abv to a writing unit 15. The writing unit 15 modulates and scans each of 5 laser beams for Y, M, C, Bk, and Abv to sequentially form an electrostatic latent image on each of photoconductor drums 21, 22, 23, 24, and 25 after charging the photoconductor drums with charging units 51, 52, 53, 54, and 55. For example, the first photoconductor drum 21 corresponds to Y, the second photoconductor drum 22 corresponds to M, the third photoconductor drum 23 corresponds to C, the fourth photoconductor drum 24 corresponds to Bk, and the fifth photoconductor drum 25 corresponds to Abv.

Next, toner images of different colors are formed on the respective photoconductor drums 21, 22, 23, 24, and 25 by the respective developing units 31, 32, 33, 34, and 35 serving as developer deposition units. Moreover, transfer paper fed by a paper feeding unit 16 is transported on a transfer belt 70, and the toner images on the photoconductor drums 21, 22, 23, 24, and 25 are sequentially transferred onto the transfer paper by transfer chargers 61, 62, 63, 64, and 65, respectively.

After completing the transferring step, the transfer paper is transported to the fixing unit 80, and the toner image transferred on the transfer paper is fixed by the fixing unit 80.

After completing the transferring step, the toners remained on the photoconductor drums 21, 22, 23, 24, and 25 are removed by the cleaning units 41, 42, 43, 44, and 45.

In the device of FIG. 2 and an image forming method using the device, toner images formed on photoconductor drums 21, 22, 23, 24, and 25 in the same manner as in FIG. 1 are transferred a transfer drum once, and the toner images are transferred on a transfer sheet by a secondary transferring unit 66, followed by fixing by a fixing device 80.

As illustrated in FIG. 3, the antibacterial antiviral toner may be transferred to a separate transfer drum.

Next, a structure surrounding a developing unit will be explained.

FIG. 4 is an enlarged structural view illustrating one of the developing units 31, 32, 33, 34, and 35 serving as five developer depositing units, and one of the photoconductor drums 21, 22, 23, 24, and 25. Since the structures of the developing units and the photoconductors are the same except that a color of the toner for use is different, the developing unit and the photoconductor drum in FIG. 4 are referred to as a developing unit 4 and a photoconductor drum 1.

The developing unit 4 of the present embodiment includes a developing container 2 storing a two-component developer, and a developing sleeve 11 serving as a developer bearing member that is rotatably disposed at an opening of the developing container 2 facing a photoconductor drum 1 with the predetermined gap with the photoconductor 11.

The developing sleeve 11 is a cylinder formed of a nonmagnetic material, and rotates in the manner that the area of the developing sleeve facing the photoconductor 1 rotates in the same direction to the rotational direction of the photoconductor 1 indicated with the arrow. A magnetic roller that is a magnetic field-generating unit is fixed and disposed at the inner side of the developing sleeve 11. The magnetic roller has 5 magnetic poles (N1, S1, N2, N3, and S2). A regulating blade 10 serving as a developer regulating member is disposed at a part of a developer container 2 above the developing sleeve 11 and the regulating blade 10 is arranged without contact with the developer sleeve 11 towards near a magnetic pole (S2) positioned at almost the uppermost point of the magnetic roller in the vertical direction.

Inside the developer container 2, three developer conveyance channels, i.e., a supply conveyance channel 2a including a supply screw 5 that is a first developer stirring-conveyance unit, a collection conveyance channel 2b including a collection screw 6 that is a second developer stirring-conveyance unit, and a stirring conveyance channel 2c including a stirring screw 7 that is a third developer stirring-conveyance unit, are disposed. The supply conveyance channel 2a and the stirring conveyance channel 2c are arranged in a diagonally up-down direction. Moreover, the collection conveyance channel 2b is arranged at a downstream side of the developing region of the developing sleeve 11, and at a side substantially parallel to the stirring conveyance channel 2c.

The two-component developer stored in the developer container 2 is supplied from the supply conveyance channel 2a to the developer sleeve 11, while being circulated and transported through the supply conveyance channel 2a, the collection conveyance channel 2b, and the stirring conveyance channel 2c by stirring and conveyance performed by the supply screw 5, the collection screw 6, and stirring screw 7. The developer supplied to the developing sleeve 11 is lifted on the developing sleeve 11 with the magnetic pole (N2) of the magnetic roller.

Along with the rotation of the developing sleeve 11, the developer is transported on the developing sleeve 11 from the magnetic pole (S2) to the magnetic pole (N1) and from the magnetic pole (N1) to the magnetic pole (S1), and the developer reaches a developing region where the developing sleeve 11 and the photoconductor 1 face each other. In the process of the transportation to the developer region, a thickness of the developer is magnetically regulated with the regulating blade 10 together with the magnetic pole (S2) to form a thin layer of the developer on the developing sleeve 11.

The magnetic pole (S1) of the magnetic roller within the developing sleeve 11 positioned in the developing region is a developing main pole, and the developer transported to the developing region is formed into a shape of bristles by the magnetic pole (S1) to be in contact with a surface of the photoconductor 1 to thereby develop an electrostatic latent image formed on the surface of the photoconductor 1.

Along with the rotation of the developing sleeve 11, the developer with which the latent image is developed is passed through the developing region, is returned into the developer container 2 via the conveyance pole (N3), is released from the developing sleeve 11 with repulsive magnetic fields of the magnetic poles (N2 and N3), and is collected to the collection conveyance channel 2*b* by the collection screw 6.

The supply conveyance channel 2*a* and the collection conveyance channel 2*b* disposed diagonally downwards relative to the supply conveyance channel 2*a* are par-titioned by a first partitioning member 3A. At the downstream part of the conveyance direction created by the collection screw 6 of the collection conveyance channel 2*b*, an opening for supply a developer, where the opening is configured to supply the collected developer to the stirring conveyance channel 2*c*, is disposed.

Moreover, the supply conveyance channel 2*a* and the stirring conveyance channel 2*c* disposed diagonally downwards relative to the supply conveyance channel 2*a* are par-titioned with a third partitioning member 3C.

FIG. 5 is a cross-sectional view illustrating the collection conveyance channel 2*b* and the stirring conveyance channel 2*c* at the downstream part of the conveyance direction created by the collection screw 6. An opening 2*d* for communicating between the collection conveyance channel 2*b* and the stirring conveyance channel 2*c* is disposed.

Moreover, the supply conveyance channel 2*a* and the stirring conveyance channel 2*c* disposed diagonally downwards relative to the supply conveyance channel 2*a* are par-titioned with a third partitioning member 3C. At the upstream part and the downstream part of the conveyance direction created by the supply screw 5 of the supply conveyance channel 2*a*, openings for supplying a developer, where the openings are configured to supply the developer, are disposed.

FIG. 6 is a cross-sectional view illustrating the developing unit 4 at the upstream part of the conveyance direction created by the supply screw 5. An opening 2*e* for communicating between the stirring conveyance channel 2*c* and the supply conveyance channel 2*a* is disposed in the third partitioning member 3C.

Moreover, FIG. 7 is a cross-sectional view illustrating the developing unit 4 at the downstream part of the conveyance direction created by the supply screw 5. An opening 2*f* for communicating between the stirring conveyance channel 2*c* and the supply conveyance channel 2*a* is disposed in the third partitioning member 3C.

Next, circulation of the developer within the three developer conveyance channels will be explained.

FIG. 8 is a schematic view illustrating a flow of the developer within the developing unit 4. In FIG. 8, each arrow denotes a travelling direction of the developer. In the supply conveyance channel 2*a* that has received the developer from the stirring conveyance channel 2*c*, the developer is transported to the downstream side of the conveyance direction created by the supply screw 5. Then, the excess developer transported to the downstream part of the conveyance direction of the supply conveyance channel 2*a* without being supplied to the developing sleeve 11 is supplied to the stirring conveyance channel 2*c* from the opening 2*f* disposed as a first developer-supplying opening in the third partitioning member 3C.

Moreover, the collected developer that is collected to the collection conveyance channel 2*b* from the developing sleeve 11 by the collection screw 6 and is transported to the downstream part of the conveyance direction in the same direction to the developer of the supply conveyance channel 2*a* is supplied to the stirring conveyance channel 2*c* from the opening 2*d* disposed as a second developer supplying opening in the second partitioning member 3B.

In the stirring conveyance channel 2*c*, the supplied excess developer and collected developer are stirred by the stirring screw 7 and are transported in the reverse direction to the direction of the flow of the direction in the collection conveyance channel 2*b* and the supply conveyance channel 2*a*. Then, the developer transported to the downstream side of the conveyance direction of the stirring conveyance channel 2*c* is supplied to the upstream part of the conveyance direction of the supply conveyance channel 2*a* from the opening 2*e* disposed as a third developer supply opening in the third partitioning member 3C.

Moreover, a toner concentration sensor (not illustrated) is disposed below the stirring conveyance channel 2*c* and a toner supply-controlling device that is not illustrated is operated by output from the sensor to supply a toner from a toner accommodating unit (not illustrated). In the stirring conveyance channel 2*c*, a toner suppled from a toner supply opening 3 according to the necessity is transported to the downstream side of the conveyance direction with being stirred together with the collected developer and the excess developer by the stirring screw 7. When the toner is supplied, the toner is preferably supplied at the upstream of the stirring screw 7 because a long stirring time from the supply to the developing can be assured.

As described above, the developing unit 4 includes a supply conveyance channel 2*a* and a collection conveyance channel 2*b* and performs supply and collection of the developer in different developer conveyance channels. Therefore, the developer used for the developing is not mixed in the supply conveyance channel 2*a*. Accordingly, a tendency that larger reduction in the toner concentration of the developer supplied to the developing sleeve 11 is caused at the further downstream side of the conveyance direction of the supply conveyance channel 2*a* can be prevented. Since the developing unit 4 includes the collection conveyance channel 2*b* and the stirring conveyance channel 2*c* and performs collection and stirring of the developer in different developer conveyance channels, moreover, the developer used for the developing does not drip during the stirring. Accordingly, the sufficiently stirred developer is supplied to the supply conveyance channel 2*a* and therefore insufficient stirring of the developer supplied to the supply conveyance channel 2*a* can be prevented.

As described above, reduction in the toner concentration in the developer within the supply conveyance channel 2*a* can be prevented and insufficient stirring of the developer in the supply conveyance channel 2*a* can be prevented. Therefore, image density during developing can be kept constant.

Moreover, at the upstream part of the conveyance direction of the supply conveyance channel 2*a* illustrated in FIG. 6, the developer is supplied from the stirring conveyance channel 2*c* disposed diagonally below to the supply conveyance channel 2*a* disposed above. The exchanged of the above-mentioned exchanged of the developer is to supply the developer to the supply conveyance channel 2*a* in the following manner. The developer is pushed in by the rotation of the stirring screw 7 to pile up the developer to spill the developer from the opening 2*e* to supply to the supply conveyance channel 2*a*. Such movement of the developer gives stress to the developer and is a factor of reducing a service life of the developer.

Since the supply conveyance channel 2*a* is arranged diagonally above the stirring conveyance channel 2*c* in the developing unit 4, stress applied to the developer due to the upward movement of the developer can be reduced compared to a developing unit where the supply conveyance channel 2*a* is disposed vertically above the stirring conveyance channel 2*c* to lift the developer up.

At the downstream part of the conveyance direction created by the supply screw 5 illustrated in FIG. 7, moreover, an opening 2*f* for communicating between the supply conveyance channel 2*a* and the stirring conveyance channel 2*c* is disposed for supplying the developer from the supply conveyance channel 2*a* disposed above to the stirring conveyance channel 2*c* disposed diagonally below. The third partitioning member 3C partitioning into the stirring conveyance channel 2*c* and the supply conveyance channel 2*a* is extended upwards from the lowest point of the supply conveyance channel 2*a* and the opening 2*f* is disposed at the upper position relative to the lowest point.

Moreover, FIG. 9 is a cross-sectional view illustrating a developing unit 4 at the most downstream part of the conveyance direction created by the supply screw 5. As illustrated in FIG. 9, at the downstream part relative to the opening 2*f* in the conveyance direction created by the supply screw 5, an opening 2*g* for communicating between the stirring conveyance channel 2*c* and the supply conveyance channel 2*a* is disposed in the third partitioning member 3C. Moreover, the opening 2*g* is disposed upwards relative to the top of the opening 2*f*.

In the supply conveyance channel 2*a* having the openings 2*f* and 2*g*, among the developer transported to the opening 2*f* through the supply conveyance channel 2*a* along the axial direction by the supply screw 5, the volume of the developer reached to the height of the lowest part of the opening 2*f* falls down to the stirring conveyance channel 2*c* below via the opening 2*f*. Meanwhile, the developer that does not reach the height of the lowest part of the opening 2*f* is transported to the downstream side by the supply screw 5 to be supplied to the developing sleeve 11.

Therefore, at the downstream side relative to the opening 2*f* in the supply conveyance channel 2*a*, the volume of the developer becomes gradually lower than the lowest part of the opening 2*f*. Since the most downstream part of the supply conveyance channel 2*a* is dead end, the volume of the developer becomes high at the most downstream part. When the height of the developer reaches a certain height, the developer is pushed back against the rotations of the supply screw 5 and is returned to the opening 2*f*, and the developer reaching the height of the lowest part of the opening 2*f* falls down to the stirring conveyance channel 2*c* below via the opening 2*f*.

As a result, the volume of the developer does not continue to increase at the downstream side from the opening 2*f* of the supply conveyance channel 2*a* and the volume of the developer is in an equilibrium state with an inclination adjacent to the lowest part of the opening 2*f*. By arranging the opening 2*g* at a position higher than the uppermost part of the opening 2*f*, i.e. a position higher than the equilibrium state, sufficient ventilation can be assured in the stirring conveyance channel 2*c* and the supply conveyance channel 2*a* without blocking the opening 2*f* with the developer to cause insufficient ventilation.

Specifically, the opening 2*g* exhibits a function as a ventilation opening for assuring sufficient ventilation between the supply conveyance channel 2*a* and the stirring conveyance channel 2*c* as well as a function as an opening for supplying a developer between the supply conveyance channel 2*a* and the stirring conveyance channel 2*c*. Since the ventilation opening 2*g* is disposed, sufficient ventilation can be assured with the supply conveyance channel 2*a* to which a filter for passing air through is disposed and arranged above the stirring conveyance channel 2*c*, even when internal pressure of the stirring conveyance channel 2*c* disposed below and the collection conveyance channel 2*b* communicating to the stirring conveyance channel 2*c* increases, and therefore an increase in the internal pressure of the entire developing unit 4 can be prevented.

The toner of the present disclosure can be used in a process cartridge. The process cartridge includes a photoconductor and at least one selected from the group consisting of an electrostatic latent image forming unit, a developing unit, and a cleaning unit, where the photoconductor and the unit(s) are supported as an integrated unit. The process cartridge is detachably mounted in a main body of an image forming apparatus.

FIG. 10 illustrates a schematic structure of an example of the image forming apparatus including a process cartridge 50, in which the developer (may be also referred to as a developer for developing an electrostatic latent image) of the present disclosure is stored. In FIG. 10, the process cartridge 50 includes a photoconductor 20, an electrostatic latent image forming unit 32, a developing unit 40, and a cleaning unit 61.

In the present disclosure, a plurality of units selected from the above-mentioned constitutional elements, such as the photoconductor 20, the electrostatic latent image forming unit 32, the developing unit 40, and the cleaning unit 61, are integrated as a process cartridge, and the process cartridge 50 is detachably mounted in a main body of an image forming apparatus, such as a photocopier and a printer.

An operation of an image forming apparatus equipped with a process cartridge including the developer of the present disclosure will be explained as follows.

A photoconductor is driven to rotate at the predetermined rim speed. In the process of the rotation of the photoconductor, a circumferential surface of the photoconductor is uniformly charged with predetermined positive or negative voltage by the electrostatic latent image-forming unit. Subsequently, the surface of the photoconductor is exposed to image exposure light emitted from an image exposure unit, such as a slit exposure and laser beam scanning exposure to sequentially form electrostatic latent images on the circumferential surface of the photoconductor. Next, the formed electrostatic latent images are developed with toners by the developing unit to form toner images. The developed toner images are sequentially transferred by the transferring unit to a transfer sheet fed from the paper feeding unit between the photoconductor and the transferring unit with synchronizing the rotations of the photoconductor.

The transfer sheet to which the image has been transferred is separated from the surface of the photoconductor and is introduced into an image fixing unit to fix the image. The resultant is printed out as a copy from the apparatus to the outside the apparatus. The surface of the photoconductor after transferring the images is cleaned by removing the residual toner after transferring by the cleaning unit, followed by eliminating the charge, to be ready for the following image formation.

(Toner Storage Unit)

The toner storage unit of the present disclosure includes a toner and a unit configured to store the toner. Examples of the toner stored container, a developing device, and a process cartridge.

The toner stored container includes a toner and a container, in which the toner is stored.

The developing device is a unit configured to store a toner and develop with the toner.

The process cartridge includes at least an image bearer and a developing unit which are integrated, stores therein a toner, and is detachably mounted in an image forming apparatus. The process cartridge may further include at least one selected from the group consisting of a charging unit, an exposing unit, and a cleaning unit.

Since image formation is performed by mounting the toner storage unit of the present disclosure in an image forming apparatus, the image formation is performed using the toner of the present disclosure. Therefore, an image having an antibacterial or antiviral effect can be stably formed.

(Printed Product)

According to the present disclosure, a printed product having an image formed of the toner of the present disclosure is obtained. The printed product of the present disclosure includes a recording medium (base), and an image formed of the toner of the present disclosure on the recording medium. Since the toner (antibacterial antiviral toner) of the present disclosure is used, a printed product having an antibacterial or antiviral effect is obtained. The printed product of the present disclosure preferably includes a layer of a color toner formed on the recording medium, and a layer of the toner of the present disclosure formed on the entire area of the recording medium. Moreover, a thickness Z (micrometers) of the toner layer after the fixing step relative to the number average particle diameter X of the inorganic antibacterial antiviral agent is preferably in the range of $2.0X \leq Z \leq 2.5X$ (micrometers).

EXAMPLES

Examples of the present disclosure will be described hereinafter. However, the present disclosure should not be construed as being limited to these Examples. Note that, "part(s)" described below means "part(s) by mass" unless otherwise stated.

(Production of Toner)

<Toners A1-1 to A1-5>

Raw materials of a toner were as follows.

Polyester Resin 1 (RN-306SF, available from Kao Corporation, weight average molecular weight Mw: 7,700, acid value: 4 mgKOH/g): 80 parts by mass Polyester Resin 2 (RN-290SF, available from Kao Corporation, weight average molecular weight Mw: 11,000, acid value: 4 mgKOH/g): 10 parts by mass Wax dispersing agent (EXD-001, available from Sanyo Chemical Industries, Ltd.): 4 parts by mass Monoester Wax 1 (melting point mp: 70.5 degrees Celsius): 6 parts by mass Zirconium Salicylate Derivative A: 0.9 parts by mass Inorganic Antibacterial Antiviral Agent A (IONPURE ZAF-HS, available from ISHIZUKA GLASS Co., Ltd.): 2 parts by mass (number average particle diameter: 1.8 micrometers)

As Zirconium Salicylate Derivative A, the compound represented by the following structural formula (1) was used.

[Chem. 1]

Structural Formula (1)

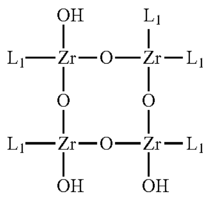

L1 in Structural Formula (1) is represented by the following structure (Structural Formula (2)).

[Chem. 2]

Structural Formula (2)

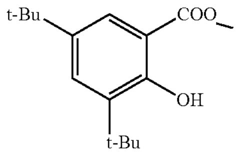

The toner raw materials of the above-listed composition were pre-mixed by means of Henschel Mixer (FM20B, available from NIPPON COKE & ENGINEERING CO., LTD.), followed by melting and kneading the resultant mixture by means of a single-screw kneader (Kneader cokneader, available from Buss AG) at a temperature of from 100 degrees Celsius through 130 degrees Celsius.

After cooling the obtained kneaded product to room temperature, the kneaded product was roughly pulverized by means of Rotoplex into the size of from 200 micrometers through 300 micrometers.

The roughly pulverized particles were finely pulverized by means of a counter jet mill (100 AFG, available from HOSOKAWA MICRON CORPORATION) to obtain particles having the weight average particle diameter of 4.8±0.3 micrometers with appropriately adjusting the pulverization air pressure. Thereafter, the resultant particles were classified by means of an air classifier (EJ-LABO, available from MATSUBO Corporation) with appropriately adjusting an opening degree of a louver in a manner that the weight average molecular weight of the classified particles was to be 5.5 micrometers, and a ratio of the weight average particle diameter to the number average particle diameter was to be 1.18 or less, to thereby obtain Toner Base Particles A1-1.

Next, Toner Base Particles A1-2 was obtained in the same manner as Toner Base Particles A1-1, except that the amount of Inorganic Antibacterial Antiviral Agent A was changed to 3 parts by mass.

Moreover, Toner Base Particles A1-3, Toner Base Particles A1-4, Toner Base Particles A1-5 were obtained by changing the amount of Inorganic Antibacterial Antiviral Agent A to 4 parts by mass, 5 parts by mass, and 6 parts by mass, respectively.

Subsequently, 100 parts by mass of each of Toner Base Particles A1-1 to A1-5 was mixed with additives, i.e., 1.6 parts by mass of fumed silica (ZD-30ST, available from Tokuyama Corporation), 0.8 parts by mass of fumed silica (UFP-35HH, available from Denka Company Limited), and 0.8 parts by mass of titanium dioxide (MT-150 AFM, available from TAYCA CORPORATION), and the resultant mixture was stirred and mixed by Henschel Mixer to produce each of Toners A1-1 to A1-5. The weight average particle diameter Y of the toner was 5.5 micrometers.

<Toners A2-1 to A2-5>

Next, the toner raw materials having the same composition as the toner raw materials of Toner Base Particles A1-1 were pre-mixed by means of Henschel Mixer (FM20B, available from NIPPON COKE & ENGINEERING CO., LTD.), followed by melting and kneading the resultant mixture by means of a single-screw kneader (Kneader cokneader, available from Buss AG) at a temperature of from 100 degrees Celsius through 130 degrees Celsius.

After cooling the obtained kneaded product to room temperature, the kneaded product was roughly pulverized by means of Rotoplex into the size of from 200 micrometers through 300 micrometers.

The roughly pulverized particles were finely pulverized by means of a counter jet mill (100 AFG, available from HOSOKAWA MICRON CORPORATION) to obtain particles having the weight average particle diameter of 6.4±0.3 micrometers with appropriately adjusting the pulverization air pressure. Thereafter, the resultant particles were classified by means of an air classifier (EJ-LABO, available from MATSUBO Corporation) with appropriately adjusting an opening degree of a louver in a manner that the weight average molecular weight of the classified particles was to be 7.0 micrometers, and a ratio of the weight average particle diameter to the number average particle diameter was to be 1.18 or less, to thereby obtain Toner Base Particles A2-1.

Moreover, Toner Base Particles A2-2 to A2-5 were obtained by changing the amount of Antibacterial Antiviral Agent A to 3 parts by mass, 4 parts by mass, 5 parts by mass, and 6 parts by mass, respectively.

Subsequently, 100 parts by mass of each of Toner Base Particles A2-1 to A2-5 was mixed with additives, i.e., 1.0 part by mass of fumed silica (ZD-30ST, available from Tokuyama Corporation), 0.5 parts by mass of fumed silica (UFP-35HH, available from Denka Company Limited), and 0.5 parts by mass of titanium dioxide (MT-150 AFM, available from TAYCA CORPORATION), and the resultant mixture was stirred and mixed by Henschel Mixer to produce each of Toners A2-1 to A2-5. The weight average particle diameter Y of the toner was 7.0 micrometers.

<Toners A3-1 to A3-5>

Next, Toner Base Particles A3-1 to A3-5 were obtained in the same manner as the production of Toner Base Particles A1-1, except that the weight average particle diameter was to be 9.0 micrometers. Subsequently, 100 parts by mass of each of Toner Base Particles A3-1 to A3-5 was mixed with additives, i.e., 0.6 parts by mass of fumed silica (ZD-30ST, available from Tokuyama Corporation), 0.3 parts by mass of fumed silica (UFP-35HH, available from Denka Company Limited), and 0.3 parts by mass of titanium dioxide (MT-150 AFM, available from TAYCA CORPORATION), and the resultant mixture was stirred and mixed by Henschel Mixer to produce each of Toners A3-1 to A3-5. The weight average particle diameter Y of the toner was 9.0 micrometers.

<Toners B1-1 to B3-5, Toners C1-1 to C3-5, and Toners D1-1 to D3-5>

Toners B1-1 to B3-5, Toners C1-1 to C3-5, and Toners D1-1 to D3-5 were produced in the same manner as the production of Toners A group, except that Inorganic Antibacterial Antiviral Agent A was changed to Inorganic Antibacterial Antiviral Agents B to F, amounts of Inorganic Antibacterial Antiviral Agents B to F were varied in the range of 2 parts by mass to 6 parts by mass, and the weight average particle diameter of the toner was changed to 5.5 micrometers, 7.0 micrometers, and 9.0 micrometers.

<Detail of Inorganic Antibacterial Antiviral Agents A to F>

Detail of Inorganic Antibacterial Antiviral Agents A to F (Antibacterial Agents A to F) is as follows.

Inorganic Antibacterial Antiviral Agent A: IONPURE ZAF-HS, available from ISHIZUKA GLASS Co., Ltd. (number average particle diameter X: 1.8 micrometers, antibacterial metal: including Ag and Zn)

(shapes of particle: no cubes and no cuboids, support particles: silicon-based glass)

Inorganic Antibacterial Antiviral Agent B: IONPURE WPA, available from ISHIZUKA GLASS Co., Ltd. (number average particle diameter X: 1.6 micrometers, antibacterial metal: including Ag and Zn)

(shapes of particle: no cubes and no cuboids, support particles: silicon-based glass)

Inorganic Antibacterial Antiviral Agent C: Zeomic AJ10N, available from Sinanen Zeomic Co., Ltd. (number average particle diameter X: 2.3 micrometers, antibacterial metal: including Ag and Zn)

(shapes of particles: cubes, support particles: zeolite)

Inorganic Antibacterial Antiviral Agent D: NOVARON VZF200, available from TOAGOSEI CO., LTD. (number average particle diameter X: 2.8 micrometers, antibacterial metal: including Zn)

(shapes of particle: no cubes and no cuboids)

Inorganic Antibacterial Antiviral Agent E: NOVARON VZN300, available from TOAGOSEI CO., LTD. (number average particle diameter X: 1.3 micrometers, antibacterial metal: including Zn)

(shapes of particles: no cubes and no cuboid)

Inorganic Antibacterial Antiviral Agent F: NOVARON IV200, available from TOAGOSEI CO., LTD. (number average particle diameter X: 0.9 micrometers, antibacterial metal: including Zn) (shapes of particles: including cubes and cuboids, where the proportion of the cubes and cuboids in the whole particles was 20% or less)

The SEM images of Antibacterial Agent C are depicted in FIGS. 11A to 11D. FIGS. 11A and 11B are the images taken with the identical scale, are taken by observing separate spots. FIGS. 11C and 11D are the images taken with the identical scale, are taken by observing separate spots. Antibacterial Agent C is a group of particles of the inorganic antibacterial antiviral agent where the particles are in the shape of cubes.

The compositions of all of the toners are presented in Tables 1 to 3.

When Toners A1-1 to A1-5 are collectively described, Toners A1-1 to A1-5 may be collectively referred to as Toner A1. When Toners A1-1 to A1-5 are collectively described, Toners A2-1 to A2-5 may be collectively referred to as Toner A2. When Toners A3-1 to A3-5 are collectively described, Toners A3-1 to A3-5 may be collectively referred to as Toner A3.

Moreover, the toners are similarly referred to as Toners B1 to B3, Toners C1 to C3, Toners D1 to D3, Toners E1 to E3, and Toners F1 to F3.

(Evaluations)

The following evaluations were performed on the obtained toners.

In the evaluations below, image formation was performed using the obtained toner, and evaluation may be performed on the image. The relationship between the number average particle diameter X of each of Antibacterial Agents A to F and the thickness Z (micrometers) of the layer of the toner after the fixing step is presented in Table 4. In Table 1, the result is presented as "I" when the relationship of 2.0X≤Z≤2.5X (micrometers) is satisfied, and the result is presented as "II" when the relationship thereof is not satisfied. In the tables, the numeral values presented together with (mg/cm$^2$) indicate the toner deposition amount on the base. The column below the toner deposition amount presents the thickness Z (micrometers) of the antibacterial antiviral toner layer (e.g., 3.0 (micrometers)).

<Production Yield Evaluation>

In the production of each toner base particles, the production yield up to the pulverization classification step was evaluated. The yield of 70% or greater was determined as "I (good)" and the yield of less than 70% was determined as "II (poor)." The results are presented in Tables 5 to 7.

As presented in the tables, Toners C1, D1, and D2 had the yield of less than 70%, and the yield was significantly low. As a result of studying the toners having the yield of less than 70%, such toners did not satisfy the relationship of 3X≤Y where X was the number average particle diameter (micrometers) of the antibacterial antiviral agent, and Y was the weight average particle diameter (micrometers) of the toner. Specifically, it was found that excellent production yield could not be obtained when the toner satisfied 3X>Y.

<Production of Two-Component Developer>

<<Production of Carrier>>

Raw materials of a carrier were as follows.

Silicone resin (organo straight silicone): 100 parts by mass

Toluene: 100 parts by mass

γ-(2-Aminoethyl)aminopropyltrimethoxysilane: 5 parts by mass

Carbon black: 10 parts by mass

The mixture of the above-listed raw materials was dispersed by means of Homomixer for 20 minutes, to prepare a coating layer forming liquid. The coating layer forming liquid was applied to Mn ferrite particles, which were served as cores, and had the weight average particle diameter of 35 micrometers to give the average film thickness of 0.20 micrometers on a surface of each core by means of a fluid bed coating device, and the applied liquid was dried by adjusting the temperature of the fluid chamber to 70 degrees Celsius. Subsequently, the resultant was baked in an electric furnace for 2 hours at 180 degrees Celsius, to thereby obtain a carrier.

<<Production of Two-Component Developer>>

Two-component developers were prepared using the toners having the production yield of "I" among Toners A1 to F3 produced above, and the carrier. For production of the two-component developer, the toner and the carrier were homogeneously mixed by means of TURBULA MIXER (available from Willy A. Bachofen AG (WAB)) for 5 minutes at 48 rpm to charge and produce a two-component developer. As a blending ratio between the toner and the carrier, the toner and the carrier were blended to match the toner density (5% by mass) of the initial developer of the evaluation device.

<Evaluation of Chargeability>

The following chargeability evaluation was performed on each of the developers (two-component developers) produced above.

Each developer unit of Ricoh monochrome MFP "RICOH MP 305+SPF" was charged with the developer. After leaving the developing unit to idle for 10 minutes in the environment of 20° C.50% RH, in the environment of 10° C.20% RH, or in the environment of 35° C.85% RH, the quantity of charge of the toner was measured. The quantity of the charge in the environment of 20° C.50% RH was determined as MMq, the quantity of the charge in the environment of 10° C.20% RH was determined as LLq, and the quantity of the charge in the environment of 35° C.85% RH was determined as HHq. When the value of the following formula (1) was less than 1, the developer was judged as having stable chargeability against the environment, i.e. "I (acceptable)." When the value of the formula (1) was 1 or greater, the developer was judged as having unstable chargeability against the environment, i.e., "TT (unacceptable)." If the chargeability is unstable to the environment, the toner deposition amount on the base (recording medium) becomes inconsistence due to the fluctuations of the environment, and therefore the antibacterial antiviral effect may not be stably obtained.

$$(|LLq-MMq|+|MMq-HHq|)/MMq \qquad \text{Formula (1)}$$

The results of the chargeability evaluation are presented in Tables 5 to 7.

As presented in the tables, it was found that chargeability was adversely affected when the number average particle diameter of the antibacterial antiviral agent was less than 1.5 micrometers, or when the amount of the antibacterial antiviral agent in the toner was greater than 5.0% by mass. For example, some of Toners E1 to F3 which used Antibacterial Agent E or Antibacterial Agent F had unacceptable chargeability evaluation results. Moreover, the chargeability became unacceptable when the amount of the antibacterial antiviral agent was greater than 5.0% by mass even through the number average particle diameter of the antibacterial antiviral agent was 1.8 micrometers or less (for example, Toner A1-5, Toner B1-5, etc.).

<Transmittance Evaluation>

Next, an image was formed with the developer having the result "I (acceptable)" in the chargeability evaluation, and the transmittance evaluation was performed as follows.

A solid image was printed on the entire area of an A-4 size OHP sheet (Kokuyo OHP Film VF-1411N) with the toner deposition amount below by means of the Ricoh monochrome MFP "RICOH MP 305+SPF" with adjusting the process conditions, such as developing conditions.

The thickness Z of the deposition film (the thickness Z of the antibacterial antiviral toner layer) was measured by cutting the sheet into a thin piece, slicing the thin piece vertically with a knife, and observing the cross-section of the sliced surface under an electron microscope.

(Toner Deposition Amount)

0.38±0.02 mg/cm$^2$ (deposition film thickness: 3.0 micrometers)

0.45±0.02 mg/cm$^2$ (deposition film thickness: 3.5 micrometers)

0.51±0.02 mg/cm$^2$ (deposition film thickness: 4.0 micrometers)

0.58±0.02 mg/$cm^2$ (deposition film thickness: 4.5 micrometers)

0.64±0.02 mg/$cm^2$ (deposition film thickness: 5.0 micrometers)

The transmittance of the solid image to light in the wavelength range of from 350 nm to 700 nm was measured by means of UV-Visible/NIR spectrophotometer V-660 (available from JASCO Corporation). As illustrated in FIG. 12, 9 samples each in the size of 50 mm×50 mm were evenly cut out from the A4-size sheet, the samples were measured, and the lowest numeral value of the transmittance was taken as a result. The result was evaluated based on the following evaluation criteria. The results are presented in Tables 5 to 7.

(Evaluation Criteria)

When the transmittance with light of the shortest wavelength in the wavelength region was 25% or greater, the transmittance was determined as "I (acceptable)." When the transmittance was less than 25%, the transmittance was determined as "II (unacceptable)." If the transmittance is less than 25%, the image printed below the layer formed with the toner including the antibacterial antiviral agent becomes unclear.

<Solid Image Evaluation>

Next, the sample piece having the lowest transmittance among the 9 samples cut out from each printed product in the above-described transmittance evaluation was subjected to observation of the deposition state of the toner of the solid image under a laser microscope (OPTELIC H1200, available from Lasertec Corporation). As the evaluation criteria, the state where the base was completely covered with the toner was determined as "I (acceptable)," and the state where there was an area in which the toner is not deposited at least a part of the solid image was determined as "II (unacceptable)."

The results are presented in Tables 5 to 7.

As presented in the tables, all of the toners having the weight average particle diameter of 5.5 micrometers had the result of "I (acceptable)." Specifically, all of the toners to which the evaluation was performed among Toners A1, B1, E1, and F1 had had the result of "I."

On the other hand, some of the toners having the weight average particle diameter of 7.0 micrometers and the toners having the weight average particle diameter of 9.0 micrometers had the result of "II (unacceptable)." As presented in the tables, the toners had the result of "II (unacceptable)" when the toner had the weight average particle diameter of 7.0 micrometers, when the toner had the weight average particle diameter of 9.0 micrometers even through the toner deposition amount was 0.38 mg/$cm^2$, when the toner had the weight average particle diameter of 9.0 micrometers, and when the toner deposition amount was 0.38 mg/$cm^2$ and 0.45 mg/$cm^2$.

<Evaluation of State of Antibacterial Antiviral Agent Exposed to Surface>

Next, the samples which had the results of "I (acceptable)" in the solid image evaluation were subjected to the evaluation of the state of the antibacterial antiviral agent exposed to the surface in the following manner.

In the evaluation of the surface exposure state, the antibacterial antiviral agent on the surface of the image was observed by means of a scanning electron microscope (SEM, SU8230, available from Hitachi, Ltd.) and energy dispersive X-ray analyzer (EDX, XFlash FlatQUAD 5060F, available from Bruker).

A sample piece was cut out from the sample having the lowest transmittance among the samples subjected to the transmittance evaluation. The sample piece was prepared into 10 observation pieces. In each observation piece, 5 regions each in the size of 60 micrometers×60 micrometers were randomly selected. Among the 50 regions in total, the region in which the 20 or more exposed areas of the antibacterial antiviral agent was evaluated.

In the evaluation, the image surface was recorded by an SEM photogtaph. Moreover, the conditions of EDX were set as follows, 1+6 micrometers Mylar was selected as the filter of the detection unit, and mapping was performed with setting the hypermap to a period of at least 180s.

(EDX Observation Conditions)

Acceleration voltage: 15 kv

Emission: 25 mV

Probe current: High

Condenser lens: 1.0

W.D.: 11.0

Image magnification: 2,000 times SE(U)+SE(L)

(Evaluation Criteria)

A: 20 or more exposed areas of the antibacterial antiviral agent were observed in all of the 50 regions.

B: 10 or more exposed areas of the antibacterial antiviral agent were observed in all of the 50 regions.

C: There was at least one region in which the number of the exposed areas of the antibacterial antiviral agent was less than 10.

The results are presented in Tables 5 to 7.

As presented in the tables, the toner image sample using the antibacterial antiviral agent having the number average particle diameter of 1.3 micrometers or less tended to give the unstable state of the antibacterial antiviral agent exposed to the surface. Specifically, Toners E1 to F3 had the result of "C." Moreover, the toner having any of the other antibacterial antiviral agents had the result of "C" when the amount of the antibacterial antiviral agent was small (e.g., Toner A1-1), or when the toner deposition amount was large (e.g., the deposition amount of 0.64 mg/$cm^2$ etc.).

The EDX measurement result of the A1 element on the image surface when the image was formed of Toner C2-3 with the deposition amount of 0.58±0.02 mg/$cm^2$ is depicted in FIG. 13. The numeral reference 101 is the antibacterial agent, and the numeral reference 102 is other materials in Toner C2-3. FIG. 13 illustrates that the antibacterial agent including A1 element is exposed to the surface of the image at a certain degree.

<Stability Test (Printing Stability Test)>

The toners having the excellent results ("I" and "B" or better) in all of the evaluation items (base particle production yield, chargeability evaluation, transmittance evaluation, and evaluation of antibacterial antiviral agent exposed to surface) were subjected to the following stability test.

As the stability test, 1,000 sheets were continuously printed with the following toner deposition amount by means of the Ricoh monochrome MFP. The evaluation criteria is as follows.

(Toner Deposition Amount)

Deposition amount of toner having weight average particle diameter of 5.5 micrometers: 0.38±0.02 mg/$cm^2$ Deposition amount of toner having weight average particle diameter of 7.0 micrometers: 0.45±0.02 mg/$cm^2$ Deposition amount of toner having weight average particle diameter of 9.0 micrometers: 0.51±0.02 mg/$cm^2$ (Evaluation Criteria)

When the solid images on the 10 sheets from the 991th output sheet to the 1,000th output sheet in the continuous printing did not have lines or spots where the toner was not deposited, the result was determined as "I (acceptable)."

When there were lines or spots where the toner was not deposited in the solid images on the 10 sheets from the 991th output sheet to the 1,000th output sheet in the continuous printing, the result was determined as "II (unacceptable)."

(Evaluation Results of Stability Test)

The results are presented in Tables 5 and 6. The stability tests performed with Toners A1 to A3, B1, C2, and C3 resulted in the excellent results. With Toner D3-3, lines were generated in the solid image, which were probably caused by the scratches made in the photoconductor, and the evaluation result was unacceptable "II."

<Antibacterial Test>

The following antibacterial test was performed on the image samples presented below to confirm an antibacterial effect.

(Image Samples)

Image sample having the Toner A1-2 deposition amount of 0.58±0.02 $mg/cm^2$

Image sample having the Toner A2-2 deposition amount of 0.58±0.02 $mg/cm^2$

Image sample having the Toner B1-2 deposition amount of 0.51±0.02 $mg/cm^2$

Image sample having the Toner C2-1 deposition amount of 0.64±0.02 $mg/cm^2$

Image sample having the Toner C2-2 deposition amount of 0.64±0.02 $mg/cm^2$

Image sample having the Toner C3-2 deposition amount of 0.64±0.02 $mg/cm^2$ (Antibacterial Test Method)

The antibacterial test was performed in the following manner according to JIS Z 2801:2012.

(1) Preculture of Test Bacteria

After culturing test bacteria (*Staphylococcus aureus, Escherichia coli*) on a nutrient agar medium, the test bacteria was further subcultured.

(2) Preparation of Test Bacteria Suspension

The bacterial cells of the test bacteria after the culturing were dispersed in a dilution liquid of a nutrient broth medium to adjust the number of the bacteria cells to from $2.5\times10^5$ cells/mL through $10\times10^5$ cells/mL.

(3) Inculation of Test Bacteria Suspension

The bacteria solution (0.4 mL) was dripped on the test surface of the test piece (processed product of 5 cm×5 cm, and unprocessed product), followed by placing a polyethylene film (4 cm×4 cm) to cover the bacterial suspension to thereby allow the bacteria suspension to be closely contact with the test piece.

(4) Measurement of the Number of Live Bacteria Cells on Test Piece Just after Inoculation of Bacteria Suspension The number of live bacterial cells on the unprocessed test piece was measured.

(5) Culturing

The test piece to which the bacteria solution was placed was subjected to incubation for 24±1 hours at 35 degrees Celsius and 90% RH or higher.

(6) Measurement of the Number of Live Cells on Test Piece after Incubation

The number of live bacteria cells on the test piece (antibacterial-processed piece or unprocessed piece).

(7) Test Result

The antibacterial activity value R of 2.0 or greater was determined as having an antibacterial effect.

$$R=(Ut-U0)-(At-U0)=Ut-At$$

R: an antibacterial activity value

U0: an average value of logarithm of the number of live cells just after contacting with the unprocessed test piece Ut: an average value of logarithm of the number of live cells 24 hours after contacting with the unprocessed test piece At: an average value of logarithm of the number of live cells 24 hours after contacting with the antibacterial processed test piece (Results of Antibacterial Test)

Image having the Toner A1-2 deposition amount of 0.58±0.02 $mg/cm^2$: An antibacterial effect was exhibited.

Image having the Toner A2-2 deposition amount of 0.58±0.02 $mg/cm^2$: An antibacterial effect was exhibited.

Image having the Toner B1-2 deposition amount of 0.51±0.02 $mg/cm^2$: An antibacterial effect was exhibited.

Image having the Toner C2-1 deposition amount of 0.64±0.02 $mg/cm^2$: No antibacterial effect was exhibited.

Image having the Toner C2-2 deposition amount of 0.64±0.02 $mg/cm^2$: An antibacterial effect was exhibited.

Image having the Toner C3-2 deposition amount of 0.64±0.02 $mg/cm^2$: An antibacterial effect was exhibited.

TABLE 1

| | Antibacterial antiviral agent | | | | | | | | | |
|---|---|---|---|---|---|---|---|---|---|---|
| Toner No. | Type | Product name | Dn X [μm] | 1.5 ≤ X5 ≤ 2.5 | Amount [mass parts] | Mass % in 100 mass % of toner | Amount 2.5-5.0 mass % | Dw Y of toner [μm] | 3X ≤ Y ≤ 4X |
| A1-1 | Antibacterial | IONPURE | 1.8 | I | 2 | 1.94 | II | 5.5 | I |
| A1-2 | Agent A | ZAF-HS | | | 3 | 2.89 | I | | |
| A1-3 | | | | | 4 | 3.81 | I | | |
| A1-4 | | | | | 5 | 4.72 | I | | |
| A1-5 | | | | | 6 | 5.61 | II | | |
| A2-1 | | | | | 2 | 1.94 | II | 7.0 | I |
| A2-2 | | | | | 3 | 2.89 | I | | |
| A2-3 | | | | | 4 | 3.81 | I | | |
| A2-4 | | | | | 5 | 4.72 | I | | |
| A2-5 | | | | | 6 | 5.61 | II | | |
| A3-1 | | | | | 2 | 1.94 | II | 9.0 | II |
| A3-2 | | | | | 3 | 2.89 | I | | |
| A3-3 | | | | | 4 | 3.81 | I | | |
| A3-4 | | | | | 5 | 4.72 | I | | |
| A3-5 | | | | | 6 | 5.61 | II | | |
| B1-1 | Antibacterial | IONPURE | 1.6 | I | 2 | 1.94 | II | 5.5 | I |
| B1-2 | Agent B | WPA | | | 3 | 2.89 | I | | |
| B1-3 | | | | | 4 | 3.81 | I | | |
| B1-4 | | | | | 5 | 4.72 | I | | |

TABLE 1-continued

| Toner No. | Antibacterial antiviral agent Type | Product name | Dn X [μm] | 1.5 ≤ X5 ≤ 2.5 | Amount [mass parts] | Mass % in 100 mass % of toner | Amount 2.5-5.0 mass % | Dw Y of toner [μm] | 3X ≤ Y ≤ 4X |
|---|---|---|---|---|---|---|---|---|---|
| B1-5 | | | | | 6 | 5.61 | II | | |
| B2-1 | | | | | 2 | 1.94 | II | 7.0 | II |
| B2-2 | | | | | 3 | 2.89 | I | | |
| B2-3 | | | | | 4 | 3.81 | I | | |
| B2-4 | | | | | 5 | 4.72 | I | | |
| B2-5 | | | | | 6 | 5.61 | II | | |
| B3-1 | | | | | 2 | 1.94 | II | 9.0 | II |
| B3-2 | | | | | 3 | 2.89 | I | | |
| B3-3 | | | | | 4 | 3.81 | I | | |
| B3-4 | | | | | 5 | 4.72 | I | | |
| B3-5 | | | | | 6 | 5.61 | II | | |

TABLE 2

| Toner No. | Antibacterial antiviral agent Type | Product name | Dn X [μm] | 1.5 ≤ X ≤ 2.5 | Amount [mass parts] | Mass % in 100 mass % of toner | Amount 2.5-5.0 mass % | Dw Y of toner [μm] | 3X ≤ Y ≤ 4X |
|---|---|---|---|---|---|---|---|---|---|
| C1-1 | Antibacterial | Zeomnic | 2.3 | I | 2 | 1.94 | II | 5.5 | II |
| C1-2 | Agent C | AJ10N | | | 3 | 2.89 | I | | |
| C1-3 | | | | | 4 | 3.81 | I | | |
| C1-4 | | | | | 5 | 4.72 | I | | |
| C1-5 | | | | | 6 | 5.61 | II | | |
| C2-1 | | | | | 2 | 1.94 | II | 7.0 | I |
| C2-2 | | | | | 3 | 2.89 | I | | |
| C2-3 | | | | | 4 | 3.81 | I | | |
| C2-4 | | | | | 5 | 4.72 | I | | |
| C2-5 | | | | | 6 | 5.61 | II | | |
| C3-1 | | | | | 2 | 1.94 | II | 9.0 | I |
| C3-2 | | | | | 3 | 2.89 | I | | |
| C3-3 | | | | | 4 | 3.81 | I | | |
| C3-4 | | | | | 5 | 4.72 | I | | |
| C3-5 | | | | | 6 | 5.61 | II | | |
| D1-1 | Antibacterial | NOVARON | 2.8 | II | 2 | 1.94 | II | 5.5 | II |
| D1-2 | Agent D | VZF200 | | | 3 | 2.89 | I | | |
| D1-3 | | | | | 4 | 3.81 | I | | |
| D1-4 | | | | | 5 | 4.72 | I | | |
| D1-5 | | | | | 6 | 5.61 | II | | |
| D2-1 | | | | | 2 | 1.94 | II | 7.0 | II |
| D2-2 | | | | | 3 | 2.89 | I | | |
| D2-3 | | | | | 4 | 3.81 | I | | |
| D2-4 | | | | | 5 | 4.72 | I | | |
| D2-5 | | | | | 6 | 5.61 | II | | |
| D3-1 | | | | | 2 | 1.94 | II | 9.0 | I |
| D3-2 | | | | | 3 | 2.89 | I | | |
| D3-3 | | | | | 4 | 3.81 | I | | |
| D3-4 | | | | | 5 | 4.72 | I | | |
| D3-5 | | | | | 6 | 5.61 | II | | |

TABLE 3

| Toner No. | Antibacterial antiviral agent Type | Product name | Dn X [μm] | 1.5 ≤ X ≤ 2.5 | Amount [mass parts] | Mass % in 100 mass % of toner | Amount 2.5-5.0 mass % | Dw Y of toner [μm] | 3X ≤ Y ≤ 4X |
|---|---|---|---|---|---|---|---|---|---|
| E1-1 | Antibacterial | NOVARON | 1.3 | II | 2 | 1.94 | II | 5.5 | II |
| E1-2 | Agent E | VZN300 | | | 3 | 2.89 | I | | |
| E1-3 | | | | | 4 | 3.81 | I | | |
| E1-4 | | | | | 5 | 4.72 | I | | |
| E1-5 | | | | | 6 | 5.61 | II | | |
| E2-1 | | | | | 2 | 1.94 | II | 7.0 | II |

TABLE 3-continued

| Toner No. | Antibacterial antiviral agent Type | Product name | Dn X [μm] | 1.5 ≤ X ≤ 2.5 | Amount [mass parts] | Mass % in 100 mass % of toner | Amount 2.5-5.0 mass % | Dw Y of toner [μm] | 3X ≤ Y ≤ 4X |
|---|---|---|---|---|---|---|---|---|---|
| E2-2 | | | | | 3 | 2.89 | I | | |
| E2-3 | | | | | 4 | 3.81 | I | | |
| E2-4 | | | | | 5 | 4.72 | I | | |
| E2-5 | | | | | 6 | 5.61 | II | | |
| E3-1 | | | | | 2 | 1.94 | II | 9.0 | II |
| E3-2 | | | | | 3 | 2.89 | I | | |
| E3-3 | | | | | 4 | 3.81 | I | | |
| E3-4 | | | | | 5 | 4.72 | I | | |
| E3-5 | | | | | 6 | 5.61 | II | | |
| F1-1 | Antibacterial | NOVARON | 0.9 | II | 2 | 1.94 | II | 5.5 | II |
| F1-2 | Agen F | IV1000 | | | 3 | 2.89 | I | | |
| F1-3 | | | | | 4 | 3.81 | I | | |
| F1-4 | | | | | 5 | 4.72 | I | | |
| F1-5 | | | | | 6 | 5.61 | II | | |
| F2-1 | | | | | 2 | 1.94 | II | 7.0 | II |
| F2-2 | | | | | 3 | 2.89 | I | | |
| F2-3 | | | | | 4 | 3.81 | I | | |
| F2-4 | | | | | 5 | 4.72 | I | | |
| F2-5 | | | | | 6 | 5.61 | II | | |
| F3-1 | | | | | 2 | 1.94 | II | 9.0 | II |
| F3-2 | | | | | 3 | 2.89 | I | | |
| F3-3 | | | | | 4 | 3.81 | I | | |
| F3-4 | | | | | 5 | 4.72 | I | | |
| F3-5 | | | | | 6 | 5.61 | II | | |

TABLE 4

| Antibacterial antiviral agent | | | | Relationship between toner deposition amount [mg/cm²] and 2.0X ≤ Z ≤ 2.5X[μm] | | | | |
|---|---|---|---|---|---|---|---|---|
| | | | | 0.38 [mg/cm²] | 0.45 [mg/cm²] | 0.51 [mg/cm²] | 0.58 [mg/cm²] | 0.64 [mg/cm²] |
| Type | Dn X [μm] | 2.0X [μm] | 2.5X [μm] | 3.0 [μm] | 3.5 [μm] | 4.0 [μm] | 4.5 [μm] | 5.0 [μm] |
| Antibacterial Agent A | 1.8 | 3.6 | 4.50 | II | II | I | I | II |
| Antibacterial Agent B | 1.6 | 3.2 | 4.00 | II | I | I | II | II |
| Antibacterial Agent C | 2.3 | 4.6 | 5.75 | II | II | II | II | I |
| Antibacterial Agent D | 2.8 | 5.6 | 7.00 | II | II | II | II | II |
| Antibacterial Agent E | 1.3 | 2.6 | 3.25 | I | II | II | II | II |
| Antibacterial Agent F | 0.9 | 1.8 | 2.25 | II | II | II | II | II |

TABLE 5

| Toner No. | Base particle production yield | Chargeability evaluation | Transmittance evaluation Toner deposition amount [mg/cm²] 0.38 | 0.45 | 0.51 | 0.58 | 0.64 |
|---|---|---|---|---|---|---|---|
| A1-1 | I | I | I | I | I | I | I |
| A1-2 | I | I | I | I | I | I | I |
| A1-3 | I | I | I | I | I | II | II |
| A1-4 | I | I | I | I | II | II | II |
| A1-5 | I | II | — | — | — | — | — |
| A2-1 | I | I | I | I | I | I | I |
| A2-2 | I | I | I | I | I | I | I |
| A2-3 | I | I | I | I | I | II | II |
| A2-4 | I | I | I | I | II | II | II |
| A2-5 | I | II | — | — | — | — | — |
| A3-1 | I | I | I | I | I | I | I |

TABLE 5-continued

| | | | | | | | |
|---|---|---|---|---|---|---|---|
| A3-2 | I | I | I | I | I | I | I |
| A3-3 | I | I | I | I | I | II | II |
| A3-4 | I | I | I | I | II | II | II |
| A3-5 | I | II | — | — | — | — | — |
| B1-1 | I | I | I | I | I | I | I |
| B1-2 | I | I | I | I | I | I | I |
| B1-3 | I | I | I | I | I | II | II |
| B1-4 | I | I | I | I | II | II | II |
| B1-5 | I | II | — | — | — | — | — |
| B2-1 | I | I | I | I | I | I | I |
| B2-2 | I | I | I | I | I | I | I |
| B2-3 | I | I | I | I | I | II | II |
| B2-4 | I | I | I | I | II | II | II |
| B2-5 | I | II | — | — | — | — | — |
| B3-1 | I | I | I | I | I | I | I |
| B3-2 | I | I | I | I | I | I | I |
| B3-3 | I | I | I | I | I | II | II |
| B3-4 | I | I | I | I | II | II | II |
| B3-5 | I | II | — | — | — | — | — |

| Toner | Solid image evaluation Toner deposition amount [mg/cm$^2$] | | | | | Evaluation of state of antibacterial antiviral agent exposed to surface Toner deposition amount [mg/cm$^2$] | | | | | Stability test Toner deposition amount [mg/cm$^2$] | | |
|---|---|---|---|---|---|---|---|---|---|---|---|---|---|
| No. | 0.38 | 0.45 | 0.51 | 0.58 | 0.64 | 0.38 | 0.45 | 0.51 | 0.58 | 0.64 | 0.38 | 0.45 | 0.51 |
| A1-1 | I | I | I | I | I | C | C | C | C | C | — | — | — |
| A1-2 | I | I | I | I | I | A | B | B | B | C | I | — | — |
| A1-3 | I | I | I | — | — | A | A | B | — | — | I | — | — |
| A1-4 | I | I | — | — | — | A | A | — | — | — | I | — | — |
| A1-5 | — | — | — | — | — | — | — | — | — | — | — | — | — |
| A2-1 | II | I | I | I | I | — | C | C | C | C | — | — | — |
| A2-2 | II | I | I | I | I | — | A | B | B | C | — | I | — |
| A2-3 | II | I | I | — | — | — | A | B | — | — | — | I | — |
| A2-4 | II | I | — | — | — | — | A | — | — | — | — | I | — |
| A2-5 | — | — | — | — | — | — | — | — | — | — | — | — | — |
| A3-1 | II | II | I | I | I | — | — | C | C | C | — | — | — |
| A3-2 | II | II | I | I | I | — | — | B | B | C | — | — | I |
| A3-3 | II | II | I | — | — | — | — | B | — | — | — | — | I |
| A3-4 | II | II | — | — | — | — | — | — | — | — | — | — | — |
| A3-5 | — | — | — | — | — | — | — | — | — | — | — | — | — |
| B1-1 | I | I | I | I | I | C | C | C | C | C | — | — | — |
| B1-2 | I | I | I | I | I | B | B | B | C | C | I | — | — |
| B1-3 | I | I | I | — | — | A | B | B | — | — | I | — | — |
| B1-4 | I | I | — | — | — | A | A | — | — | — | I | — | — |
| B1-5 | — | — | — | — | — | — | — | — | — | — | — | — | — |
| B2-1 | II | I | I | I | I | — | C | C | C | C | — | — | — |
| B2-2 | II | I | I | I | I | — | A | B | C | C | — | I | — |
| B2-3 | II | I | I | — | — | — | A | B | — | — | — | I | — |
| B2-4 | II | I | — | — | — | — | A | — | — | — | — | I | — |
| B2-5 | — | — | — | — | — | — | — | — | — | — | — | — | — |
| B3-1 | II | II | I | I | I | — | — | C | C | C | — | — | — |
| B8-2 | II | II | I | I | I | — | — | B | C | C | — | — | I |
| B3-3 | II | II | I | — | — | — | — | B | — | — | — | — | I |
| B3-4 | II | II | — | — | — | — | — | — | — | — | — | — | — |
| B3-5 | — | — | — | — | — | — | — | — | — | — | — | — | — |

TABLE 6

| Toner | Base particle | Chargeability | Transmittance evaluation Toner deposition amount [mg/cm$^2$] | | | | |
|---|---|---|---|---|---|---|---|
| No. | production yield | evaluation | 0.38 | 0.45 | 0.51 | 0.58 | 0.64 |
| C1-1 | II | — | — | — | — | — | — |
| C1-2 | II | — | — | — | — | — | — |
| C1-3 | II | — | — | — | — | — | — |
| C1-4 | II | — | — | — | — | — | — |
| C1-5 | II | — | — | — | — | — | — |
| C2-1 | I | I | I | I | I | I | I |
| C2-2 | I | I | I | I | I | I | I |
| C2-3 | I | I | I | I | I | I | II |
| C2-4 | I | I | I | I | II | II | II |
| C2-5 | I | I | II | II | II | II | II |
| C3-1 | I | I | I | I | I | I | I |
| C3-2 | I | I | I | I | I | I | I |
| C3-3 | I | I | I | I | I | I | II |

TABLE 6-continued

| | | | | | | | |
|---|---|---|---|---|---|---|---|
| C3-4 | I | I | I | I | II | II | II |
| C3-5 | I | I | II | II | II | II | II |
| D1-1 | II | — | — | — | — | — | — |
| D1-2 | II | — | — | — | — | — | — |
| D1-3 | II | — | — | — | — | — | — |
| D1-4 | II | — | — | — | — | — | — |
| D1-5 | II | — | — | — | — | — | — |
| D2-1 | II | — | — | — | — | — | — |
| D2-2 | II | — | — | — | — | — | — |
| D2-3 | II | — | — | — | — | — | — |
| D2-4 | II | — | — | — | — | — | — |
| D2-5 | II | — | — | — | — | — | — |
| D3-1 | I | I | I | I | I | I | I |
| D3-2 | I | I | I | I | I | I | I |
| D3-3 | I | I | I | I | I | I | I |
| D3-4 | I | I | I | I | II | II | II |
| D3-5 | I | I | II | II | II | II | II |

| Toner | Solid image evaluation Toner deposition amount [mg/cm$^2$] | | | | | Evaluation of antibacterial antiviral agent exposed to surface Toner deposition amount [mg/cm$^2$] | | | | | Stability test Toner deposition amount [mg/cm$^2$] | | |
|---|---|---|---|---|---|---|---|---|---|---|---|---|---|
| No. | 0.38 | 0.45 | 0.51 | 0.58 | 0.64 | 0.38 | 0.45 | 0.51 | 0.58 | 0.64 | 0.38 | 0.45 | 0.51 |
| C1-1 | — | — | — | — | — | — | — | — | — | — | — | — | — |
| C1-2 | — | — | — | — | — | — | — | — | — | — | — | — | — |
| C1-3 | — | — | — | — | — | — | — | — | — | — | — | — | — |
| C1-4 | — | — | — | — | — | — | — | — | — | — | — | — | — |
| C1-5 | — | — | — | — | — | — | — | — | — | — | — | — | — |
| C2-1 | II | I | I | I | I | — | C | C | C | C | — | — | — |
| C2-2 | II | I | I | I | I | — | A | B | B | B | — | I | — |
| C2-3 | II | I | I | I | — | — | A | A | A | — | — | I | — |
| C2-4 | II | I | — | — | — | — | A | — | — | — | — | I | — |
| C2-5 | — | — | — | — | — | — | — | — | — | — | — | — | — |
| C3-1 | II | II | I | I | I | — | — | C | C | C | — | — | — |
| C3-2 | II | II | I | I | I | — | — | B | B | B | — | — | I |
| C3-3 | II | II | I | I | — | — | — | A | A | — | — | — | I |
| C3-4 | II | II | — | — | — | — | — | — | — | — | — | — | — |
| C3-5 | — | — | — | — | — | — | — | — | — | — | — | — | — |
| D1-1 | — | — | — | — | — | — | — | — | — | — | — | — | — |
| D1-2 | — | — | — | — | — | — | — | — | — | — | — | — | — |
| D1-3 | — | — | — | — | — | — | — | — | — | — | — | — | — |
| D1-4 | — | — | — | — | — | — | — | — | — | — | — | — | — |
| D1-5 | — | — | — | — | — | — | — | — | — | — | — | — | — |
| D2-1 | — | — | — | — | — | — | — | — | — | — | — | — | — |
| D2-2 | — | — | — | — | — | — | — | — | — | — | — | — | — |
| D2-3 | — | — | — | — | — | — | — | — | — | — | — | — | — |
| D2-4 | — | — | — | — | — | — | — | — | — | — | — | — | — |
| D2-5 | — | — | — | — | — | — | — | — | — | — | — | — | — |
| D3-1 | II | II | I | I | I | — | — | C | C | C | — | — | — |
| D3-2 | II | II | I | I | I | — | — | C | C | C | — | — | — |
| D3-3 | II | II | I | I | — | — | — | B | B | — | — | — | II |
| D3-4 | II | II | — | — | — | — | — | — | — | — | — | — | — |
| D3-5 | — | — | — | — | — | — | — | — | — | — | — | — | — |

TABLE 7

| Toner | Base particle | Chargeability | Transmittance evaluation Toner deposition amount [mg/cm$^2$] | | | | |
|---|---|---|---|---|---|---|---|
| No. | production yield | evaluation | 0.38 | 0.45 | 0.51 | 0.58 | 0.64 |
| E1-1 | I | I | I | I | I | I | I |
| E1-2 | I | I | I | I | I | I | I |
| E1-3 | I | II | — | — | — | — | — |
| E1-4 | I | II | — | — | — | — | — |
| E1-5 | I | II | — | — | — | — | — |
| E2-1 | I | I | I | I | I | I | I |
| E2-2 | I | I | I | I | I | I | I |
| E2-3 | I | II | — | — | — | — | — |
| E2-4 | I | II | — | — | — | — | — |
| E2-5 | I | II | — | — | — | — | — |
| E3-1 | I | I | I | I | I | I | I |
| E3-2 | I | I | I | I | I | I | I |
| E3-3 | I | II | — | — | — | — | — |
| E3-4 | I | II | — | — | — | — | — |
| E3-5 | I | II | — | — | — | — | — |

TABLE 7-continued

| | | | | | | | |
|---|---|---|---|---|---|---|---|
| F1-1 | I | I | I | I | I | I | I |
| F1-2 | I | I | I | I | I | I | I |
| F1-3 | I | II | — | — | — | — | — |
| F1-4 | I | II | — | — | — | — | — |
| F1-5 | I | II | — | — | — | — | — |
| F2-1 | I | I | I | I | I | I | I |
| F2-2 | I | I | I | I | I | I | I |
| F2-3 | I | II | — | — | — | — | — |
| F2-4 | I | II | — | — | — | — | — |
| F2-5 | I | II | — | — | — | — | — |
| F3-1 | I | I | I | I | I | I | I |
| F3-2 | I | I | I | I | I | I | I |
| F3-3 | I | II | — | — | — | — | — |
| F3-4 | I | II | — | — | — | — | — |
| F3-5 | I | II | — | — | — | — | — |

| Toner | Solid image evaluation Toner deposition amount [mg/cm$^2$] | | | | | Evaluation of antibacterial antiviral agent exposed to surface Toner deposition amount [mg/cm$^2$] | | | | |
|---|---|---|---|---|---|---|---|---|---|---|
| No. | 0.38 | 0.45 | 0.51 | 0.58 | 0.64 | 0.38 | 0.45 | 0.51 | 0.58 | 0.64 |
| E1-1 | I | I | I | I | I | C | C | C | C | C |
| E1-2 | I | I | I | I | I | C | C | C | C | C |
| E1-3 | — | — | — | — | — | — | — | — | — | — |
| E1-4 | — | — | — | — | — | — | — | — | — | — |
| E1-5 | — | — | — | — | — | — | — | — | — | — |
| E2-1 | II | I | I | I | I | — | C | C | C | C |
| E2-2 | II | I | I | I | I | — | C | C | C | C |
| E2-3 | — | — | — | — | — | — | — | — | — | — |
| E2-4 | — | — | — | — | — | — | — | — | — | — |
| E2-5 | — | — | — | — | — | — | — | — | — | — |
| E3-1 | II | II | I | I | I | — | — | C | C | C |
| E3-2 | II | II | I | I | I | — | — | C | C | C |
| E3-3 | — | — | — | — | — | — | — | — | — | — |
| E3-4 | — | — | — | — | — | — | — | — | — | — |
| E3-5 | — | — | — | — | — | — | — | — | — | — |
| F1-1 | I | I | I | I | I | C | C | C | C | C |
| F1-2 | I | I | I | I | I | C | C | C | C | C |
| F1-3 | — | — | — | — | — | — | — | — | — | — |
| F1-4 | — | — | — | — | — | — | — | — | — | — |
| F1-5 | — | — | — | — | — | — | — | — | — | — |
| F2-1 | II | I | I | I | I | — | C | C | C | C |
| F2-2 | II | I | I | I | I | — | C | C | C | C |
| F2-3 | — | — | — | — | — | — | — | — | — | — |
| F2-4 | — | — | — | — | — | — | — | — | — | — |
| F2-5 | — | — | — | — | — | — | — | — | — | — |
| F3-1 | II | II | I | I | I | — | — | C | C | C |
| F3-2 | II | II | I | I | I | — | — | C | C | C |
| F3-3 | — | — | — | — | — | — | — | — | — | — |
| F3-4 | — | — | — | — | — | — | — | — | — | — |
| F3-5 | — | — | — | — | — | — | — | — | — | — |

In Tables 1-4, Dn denotes a number average particle diameter, and Dw denotes a weight average particle diameter.

As understood from the results above, according to Examples of the present disclosure, the toner could be stably produced, and an image having an antibacterial and/or antiviral effects can be stably formed using the toner having excellent chargeability.

REFERENCE SIGNS LIST

14: image processing unit (JPU)
15: writing unit
16: paper feeding unit
21: photoconductor drum for black (Bk) toner or developer
22: photoconductor drum for yellow (Y) toner or developer
23: photoconductor drum for magenta (M) toner or developer
24: photoconductor drum for cyan (C) toner or developer
25: photoconductor drum for antibacterial antiviral toner or developer

The invention claimed is:

1. An image forming method, comprising:

forming an electrostatic latent image on an electrostatic latent image bearer;

developing the electrostatic image with a toner to form a visible image;

transferring the visible image onto a recording medium; and fixing the transferred visible image on the recording medium, wherein the toner includes toner base particles each including a binder resin, a release agent, and particles of an inorganic antibacterial antiviral agent, and the toner satisfies all of conditions (1) to (3) below, and wherein the image forming method satisfies a relationship of $$2.0X\text{(micrometers)} \leq Z \leq 2.5X\text{(micrometers)}$$

where X (micrometers) is a number average particle diameter of the particles of the inorganic antibacterial antiviral agent, and Z (micrometers) is a thickness of a layer of the toner fixed on the recording medium, Conditions (1) the number average particle diameter X of the particles of the inorganic antibacterial antiviral agent is 1.5 (micrometers)≤X≤2.5 (micrometers), (2) 3X (micrometers)≤Y≤4X (micrometers), where Y is a weight average particle diameter of the toner base particles, and (3) an amount of the inorganic antibacterial antiviral agent in the toner is 2.8% by mass or greater, but 5.0% by mass or less.

2. The image forming method according to claim 1, wherein the toner is an antibacterial antiviral toner, and wherein the image forming method further uses a color toner that is different from the antibacterial antiviral toner.

3. The image forming method according to claim 2, wherein the image forming method includes forming a layer of the color toner on the recording medium, and forming a layer of the antibacterial antiviral toner on the layer of the color toner to cover an entire surface of the recording medium with the layer of the antibacterial antiviral toner.

4. A toner, comprising:

toner particles, each including toner base particles, wherein each of the toner base particles includes a binder resin, a release agent, and particles of an inorganic antibacterial antiviral agent, and wherein the toner is used in the image forming method according to claim 1.

5. The toner according to claim 4, wherein the inorganic antibacterial antiviral agent includes at least one selected from the group consisting of Ag, Cu, Zn, and titanium oxide, or includes metal ions of at least one selected from the group consisting of Ag, Cu, Zn, and titanium oxide.

6. The toner according to claim 4, wherein the particles of the inorganic antibacterial antiviral agent include support particles formed of alumina, zeolite, silicon-based glass, or bentonite.

7. The toner according to claim 6, wherein the inorganic antibacterial antiviral agent is a phosphate-based antibacterial antiviral agent, a silicate-based antibacterial antiviral agent, or a soluble glass-based antibacterial antiviral agent.

8. The toner according to claim 4, wherein the particles of the inorganic antibacterial antiviral agent are cubic particles or cuboid particles.

9. A developer, comprising the toner according to claim 4.

10. A printed product, comprising an image formed of the toner according to claim 4.

11. A toner storage unit, comprising:

the toner according to claim 4; and a container, in which the toner is stored.

12. An image forming apparatus, comprising:

an electrostatic latent image bearer;

an electrostatic latent image forming unit configured to form an electrostatic latent image on the electrostatic latent image bearer;

a developing unit configured to develop the electrostatic latent image with a toner to form a visible image;

a transferring unit configured to transfer the visible image onto a recording medium; and a fixing unit configured to fix the transferred visible image on the recording medium, wherein the toner includes toner base particles each including a binder resin, a release agent, and particles of an inorganic antibacterial antiviral agent, and the toner satisfies all of conditions (1) to (3) below, and wherein the image forming apparatus satisfies a relationship of $$2.0X \text{ (micrometers)} \leq Z \leq 2.5X \text{ (micrometers)}$$

where X (micrometers) is a number average particle diameter of the particles of the inorganic antibacterial antiviral agent, and Z (micrometers) is a thickness of a layer of the toner fixed on the recording medium, Conditions (1) the number average particle diameter X of the particles of the inorganic antibacterial antiviral agent is 1.5 (micrometers)≤X≤2.5 (micrometers), (2) 3X (micrometers)≤Y≤4X (micrometers), where Y is a weight average particle diameter of the toner base particles, and (3) an amount of the inorganic antibacterial antiviral agent in the toner is 2.8% by mass or greater but 5.0% by mass or less.

13. The image forming apparatus according to claim 12, wherein the toner is an antibacterial antiviral toner, and wherein the image forming apparatus includes a color toner that is different from the antibacterial antiviral toner.

* * * * *